United States Patent
Chew et al.

(10) Patent No.: US 12,136,232 B2
(45) Date of Patent: Nov. 5, 2024

(54) SYSTEM FOR DETECTING A FOREIGN OBJECT ON A RUNWAY AND A METHOD THEREOF

(71) Applicants: Rong-Jie David Chew, Singapore (SG); Rong-Qi Phoebe Chew, Singapore (SG); Khien Meow David Chew, Singapore (SG)

(72) Inventors: Rong-Jie David Chew, Singapore (SG); Rong-Qi Phoebe Chew, Singapore (SG); Khien Meow David Chew, Singapore (SG)

(73) Assignees: Rong-Jie David Chew, Singapore (SG); Rong-Qi Phoebe Chew, Singapore (SG); Khien Meow David Chew, Singapore (SG)

( * ) Notice: Subject to any disclaimer, the term of this patent is extended or adjusted under 35 U.S.C. 154(b) by 0 days.

(21) Appl. No.: 18/030,061

(22) PCT Filed: Oct. 1, 2021

(86) PCT No.: PCT/SG2021/050601
§ 371 (c)(1),
(2) Date: Apr. 3, 2023

(87) PCT Pub. No.: WO2022/071894
PCT Pub. Date: Apr. 7, 2022

(65) Prior Publication Data
US 2023/0419845 A1    Dec. 28, 2023

(30) Foreign Application Priority Data
Oct. 1, 2020    (SG) .................... 10202009789R

(51) Int. Cl.
*G08G 5/00* (2006.01)
*G06T 7/11* (2017.01)
(Continued)

(52) U.S. Cl.
CPC .................. *G06T 7/70* (2017.01); *G06T 7/11* (2017.01); *G06T 7/62* (2017.01); *G06V 10/16* (2022.01);
(Continued)

(58) Field of Classification Search
CPC ..... G06T 7/70; G06T 7/11; G06T 7/62; G06T 2207/10048; G06T 2207/30232;
(Continued)

(56) References Cited

U.S. PATENT DOCUMENTS 10,228,460 B1 * 3/2019 Jinkins ...................... G01S 7/24
2005/0007386 A1   1/2005 Berson
(Continued)

FOREIGN PATENT DOCUMENTS

CN    109784214 A    5/2019
KR    101852058 B1   4/2018

OTHER PUBLICATIONS

International Search Report and Written Opinion prepared by the ISA/AU for International Application No. PCT/SG2021/050601; 12 pages; mailed Dec. 13, 2021; in English.
(Continued)

*Primary Examiner* — Anh V La
(74) *Attorney, Agent, or Firm* — Martin & Ferraro, LLP

(57) ABSTRACT

A system for detecting a foreign object on a runway, the system including a thermal camera comprising a first field of view and adapted to capture a thermal image of a first view of an area of interest on the runway from one side of the runway, a visible light camera comprising a second field of view and adapted to capture a visible light image of the first view of the area of interest on the runway from the one side of the runway, wherein the first field of view overlaps the second field of view, detect a thermal object image in the thermal image, detect a visible light object image in the
(Continued)

visible light image, and determine that the foreign object is detected when the thermal object image and the visible light object image are detected in the thermal image and the visible light image respectively.

19 Claims, 15 Drawing Sheets

(51) Int. Cl.
*G06T 7/62* (2017.01)
*G06T 7/70* (2017.01)
*G06V 10/10* (2022.01)
*G06V 10/25* (2022.01)
*G06V 20/52* (2022.01)
*G08G 5/02* (2006.01)
*H04N 23/11* (2023.01)
*H04N 23/23* (2023.01)

(52) U.S. Cl.
CPC .............. *G06V 10/25* (2022.01); *G06V 20/52* (2022.01); *G08G 5/0021* (2013.01); *G08G 5/025* (2013.01); *H04N 23/11* (2023.01); *H04N 23/23* (2023.01); *G06T 2207/10048* (2013.01); *G06T 2207/30232* (2013.01); *G06V 2201/07* (2022.01)

(58) Field of Classification Search
CPC . G06T 2207/10004; G06T 7/00; G06V 10/16; G06V 10/25; G06V 20/52; G06V 2201/07; G06V 10/809; G06V 10/00; G06V 20/39; G06V 20/54; G08G 5/0021; G08G 5/025; G08G 5/0026; G08G 5/0056; G08G 5/0073; H04N 23/11; H04N 23/23; G03B 19/22; B64F 1/18; G08B 13/194

USPC ....... 340/947, 945, 983, 948, 951, 953, 972, 340/971
See application file for complete search history.

(56) References Cited

U.S. PATENT DOCUMENTS

| | | | |
|---|---|---|---|
| 2008/0036576 A1 | 2/2008 | Stein | |
| 2010/0231705 A1* | 9/2010 | Yahav | .................... G02B 27/01 |
| | | | 348/E7.091 |
| 2010/0309315 A1* | 12/2010 | Hogasten | ................. H04N 5/33 |
| | | | 348/E5.09 |
| 2011/0063445 A1 | 3/2011 | Chew | |
| 2013/0329052 A1 | 12/2013 | Chew | |
| 2019/0354772 A1 | 11/2019 | Tasli | |
| 2020/0126248 A1* | 4/2020 | Nitzan | .................... G06T 7/586 |
| 2020/0283163 A1* | 9/2020 | Blom | ..................... G08G 5/025 |
| 2023/0360247 A1 | 11/2023 | Chew | |

OTHER PUBLICATIONS

International Preliminary Report on Patentability prepared by the IPEA/AU for International Application No. PCT/SG2021/050601; 20 pages; mailed Nov. 28, 2022; in English.
Extended European Search Report dated Jun. 21, 2024 for co-pending European Application No. 21876116.1; 7 pages.
Knyaz Vladimir: "Recognition of low-resolution objects in remote sensing images", SPIE Proceedings; [Proceedings of SPIE ISSN 0277-786X] I SPIE, US, vol. 11155, Oct. 7, 2019 (Oct. 7, 2019), pp. 111551X-111551X, XP060126244, DOI: 10.1117/12.2533315 ISBN: 978-1-5106-3673-6.

* cited by examiner

SYSTEM FOR DETECTING A FOREIGN OBJECT ON A RUNWAY AND A METHOD THEREOF

CROSS-REFERENCE TO RELATED APPLICATIONS

This is a National Phase Application under 35 USC 371 of International Application No. PCT/SG2021/050601 filed Oct. 1, 2021, which claims priority to Singapore application Ser. No. 10/202,009789R filed Oct. 1, 2020, all of which are incorporated by reference herein in their entirety.

TECHNICAL FIELD

The present invention relates to a system for detecting a foreign object on a runway and a method thereof.

BACKGROUND

Foreign objects and debris (FOD) on an airport runway pose a hazard to aircraft landing and taking-off thereon. There are FOD detection systems using visible light spectrum cameras to perform reliable FOD detection under normal clear weather conditions. Under normal clear weather conditions, e.g. in the absence of any fog, the FOD detection system will be able to capture high resolution images of any FOD and process them for the detection of the FOD with high accuracy. FOD may include engine and aircraft parts, tools, construction debris, rubber materials, natural materials, etc.

However, during adverse weather conditions, especially under foggy weather conditions, the performance of the FOD detection system could be adversely impacted and compromised. The FOD detection system may not be able to reliably detect an FOD under foggy weather conditions, i.e. poor visibility conditions, as it operates only in the visible light spectrum. Hence, it will not be able to "see" the FOD under such conditions, e.g. through fog, which typically reduces visibility along the runway to less than 1 km. The visibility conditions may be categorised into different categories. For example, Cat II represents standard operations with associated Runway Visual Range (RVR) ranging from 550 m (1,800 feet) to 300 m (1,000 feet), Cat IIIa represents a precision instrument approach and landing operation with RVR not less than 175 m (600 feet), Cat IIIb represents a precision instrument approach and landing operation with RVR less than 175 m (600 feet) but not less than 50 m (200 feet), Cat IIIc represents a precision instrument approach and landing operation with no RVR limitations, i.e. even to zero visibility. Depending on the geographical location of the airports, the visibility of the runways at airports may vary and are categorised accordingly. While most FOD detection systems are able to detect FOD for airports with Cat II visibility, they are not able to be used for airports that experience Cat IIIa, Cat IIIb and Cat IIIc visibility.

Further, the FOD detection system often generates invalid alerts or false positive alarms. The invalid alerts may be due to some phenomena, mainly light reflections, e.g. from artificial light sources originating from nearby buildings or runway edge lights, etc. These artificial lights reflecting off the smooth runway surface or reflecting off water puddles or ponding on the runway surface may cause the FOD detection system to identify it as a FOD and hence result in invalid alerts. The number of such invalid alerts due to reflections would typically increase significantly after a rainfall when water puddles or ponding are prevalent on the runway pavement surface. Though such reflections do occur during the daytime, they are much more prevalent at night and during the periods of dawn and dusk of the day.

When an aircraft is landing onto a runway, the presence of an FOD may jeopardise the aircraft to land safely. When the aircraft is approaching the runway, it flies along a "final approach" of its flight path before reaching the landing zone. At this juncture, the aircraft would be near to the runway. The final approach is the last leg in the flight path of the aircraft as it approaches to land on the runway. The final approach flight path is a descending flight path in the direction of landing along an extended runway centreline from base leg towards the runway. The aircraft has to be aligned with the extended centreline of the runway in preparation for subsequent descending and landing on the runway. Aircraft typically turn from base leg to final approach within one to two miles from the airport. An aircraft will typically follow an approach slope on its final approach flight path to eventual touchdown on the runway landing zone. The approach slope is typically 3 degrees from the horizontal. When the visibility of the runway is low, the pilot would not be able to see any FOD on the runway and it can be disastrous if the aircraft hits the FOD or the aircraft engines injest the FOD.

Therefore, it is important to provide a solution that enables the detection of FOD during poor visibility condition, e.g. adverse weather conditions, and prevent or minimise false detection of the FOD.

SUMMARY

According to various embodiments, a method for detecting a foreign object on a runway is provided. The method includes capturing a thermal image of a first view of an area of interest on the runway from one side of the runway, capturing a visible light image of the first view of the area of interest on the runway from the one side of the runway, transforming at least one of the visible light image and the thermal image to a transformed visible light image and a transformed thermal image respectively, wherein the transformed visible light image and the transformed thermal image are of a second view of the area of interest, detecting a thermal object image in the thermal image, detecting a visible light object image in the visible light image, and determining that the foreign object is detected when the thermal object image and the visible light object image are detected in the thermal image and the visible light object image respectively.

According to various embodiments, the first view may be a perspective view.

According to various embodiments, the second view may be a cockpit view when viewed from a cockpit of an aircraft.

According to various embodiments, transforming the visible light image may include rotating the visible light image.

According to various embodiments, transforming the thermal image may include rotating the thermal image.

According to various embodiments, transforming the visible light image may include warping the visible light image.

According to various embodiments, transforming the thermal image may include warping the thermal image.

According to various embodiments, the method may further include displaying at least one of the transformed visible light image and the transformed thermal image in a display in the cockpit of an aircraft.

According to various embodiments, determining the foreign object may include generating at least one attribute of the foreign object in each of the thermal object image and visible light object image, comparing the at least one attribute of the foreign object in the thermal object image and the visible light object image, such that the foreign object is detected when the at least one attribute of the foreign object in thermal object image and the visible light object image are the same.

According to various embodiments, the at least one attribute of the foreign object may include the position of the thermal object image in the thermal image and the position of the visible light object image in the visible light image.

According to various embodiments, the at least one attribute of the foreign object in thermal object image and the visible light object image are the same when the distance between the position of the thermal object image in the thermal image and the position of the visible light object image in the visible light image is within a position parameter.

According to various embodiments, the at least one attribute of the foreign object may include the size of the thermal object image and visible light object image.

According to various embodiments, the at least one attribute of the foreign object in the thermal object image and visible light object image are the same when the difference in the size of the thermal object image in the thermal image and the size of the visible light object image in the visible light image is within a size parameter.

According to various embodiments, a method for detecting a foreign object on a runway is provided. The method includes capturing a plurality of thermal images of a first view of an area of interest on the runway from one side of the runway, capturing a plurality of visible light images of the first view of the area of interest on the runway from the one side of the runway, transforming at least one of the plurality of visible light images and the plurality of thermal images to a plurality of transformed visible light image and a plurality of transformed thermal images respectively, wherein the plurality of transformed visible light images and the plurality of transformed thermal images are of a second view of the area of interest, detecting a thermal object image in the thermal image, detecting a visible light object image in the visible light image, and determining that the foreign object is detected when the thermal object image and the visible light object image are detected in the thermal image and the visible light object image respectively.

According to various embodiments, the first view may include a perspective view.

According to various embodiments, the second view may include a cockpit view when viewed from the cockpit of an aircraft.

According to various embodiments, transforming the plurality of visible light images may include rotating the plurality of visible light images.

According to various embodiments, transforming the plurality of thermal images may include rotating the plurality of thermal images.

According to various embodiments, transforming the plurality of visible light images may include warping the plurality of visible light images.

According to various embodiments, transforming the plurality of thermal images may include warping the plurality of thermal images.

According to various embodiments, the method may further include stitching the plurality of transformed visible light images to form a unitary visible light image.

According to various embodiments, the method may further include stitching the plurality of transformed thermal images to form a unitary thermal image.

According to various embodiments, the method may further include displaying at least one of the unitary visible light image and the unitary thermal image in a display in a cockpit of an aircraft.

According to various embodiments, a system for detecting a foreign object on a runway is provided. The system includes a thermal camera comprising a first field of view and adapted to capture a thermal image of a first view of an area of interest on the runway from one side of the runway, a visible light camera comprising a second field of view and adapted to capture a visible light image of the first view of the area of interest on the runway from the one side of the runway, wherein the first field of view overlaps the second field of view, a processor in communication with the thermal camera and the visible light camera, a memory in communication with the processor for storing instructions executable by the processor, such that the processor is configured to transform at least one of the visible light image and the thermal image to a transformed visible light image and a transformed thermal image respectively, wherein the transformed visible light image and the transformed thermal image are of a second view of the area of interest, detect a thermal object image in the thermal image, detect a visible light object image in the visible light image, and determine that the foreign object is detected when the thermal object image and the visible light object image are detected in the thermal image and the visible light object image respectively.

According to various embodiments, the first view may include a perspective view.

According to various embodiments, the second view may include a cockpit view when viewed from the cockpit of an aircraft.

According to various embodiments, to transform the visible light image, the processor may be configured to rotate the visible light image.

According to various embodiments, to transform the thermal image, the processor may be configured to rotate the thermal image.

According to various embodiments, to transform the visible light image, the processor may be configured to warp the visible light image.

According to various embodiments, to transform the thermal image, the processor may be configured to warp the thermal image.

According to various embodiments, the processor may be further configured to display at least one of the transformed visible light image and the transformed thermal image in a display in a cockpit of an aircraft.

According to various embodiments, to determine the foreign object, the processor may be configured to generate at least one attribute of the foreign object in each of the thermal object image and visible light object image, compare the at least one attribute of the foreign object in the thermal object image and the visible light object image, such that the foreign object is detected when the at least one attribute of the foreign object in thermal object image and the visible light object image are the same.

According to various embodiments, the at least one attribute of the foreign object may include the position of the thermal object image in the thermal image and the position of the visible light object image in the visible light image.

According to various embodiments, the at least one attribute of the foreign object in the thermal object image and the visible light object image are the same when the distance between the position of the thermal object image in the thermal image and the position of the visible light object image in the visible light image is within a position parameter.

According to various embodiments, the at least one attribute of the foreign object may include the size of the thermal object image and visible light object image.

According to various embodiments, the at least one attribute of the foreign object in the thermal object image and visible light object image are the same when the difference in the size of the thermal object image in the thermal image and the size of the visible light object image in the visible light image is within a size parameter.

According to various embodiments, a system for detecting a foreign object on a runway divided into a plurality of sectors is provided. The system includes a plurality of sets of cameras spaced apart from each other, each of the plurality of sets of cameras may include a thermal camera includes a first field of view and adapted to capture a thermal image of a first view of an area of interest on the runway from one side of the runway, a visible light camera includes a second field of view and adapted to capture a visible light image of the first view of the area of interest on the runway from the one side of the runway, such that the first field of view overlaps the second field of view, a processor in communication with the thermal camera and the visible light camera, a memory in communication with the processor for storing instructions executable by the processor, such that the processor may be configured to transform at least one of the visible light image and the thermal image to a transformed visible light image and a transformed thermal image respectively, wherein the transformed visible light image and the transformed thermal image are of a second view of the area of interest, detect a thermal object image in the thermal image, detect a visible light object image in the visible light image, and determine that the foreign object is detected when the thermal object image and the visible light object image are detected in the thermal image and the visible light object image respectively, such that each of the plurality of sets of cameras may be configured to scan one of the plurality of sectors of the runway.

According to various embodiments, the processor may be configured to stitch the plurality of transformed visible light images from the plurality of sets of cameras to form a unitary visible light image.

According to various embodiments, the processor may be configured to stitch the plurality of transformed thermal images from the plurality of sets of cameras to form a unitary thermal image.

DETAILED DESCRIPTION

In the following examples, reference will be made to the figures, in which identical features are designated with like numerals.

Figure 1:
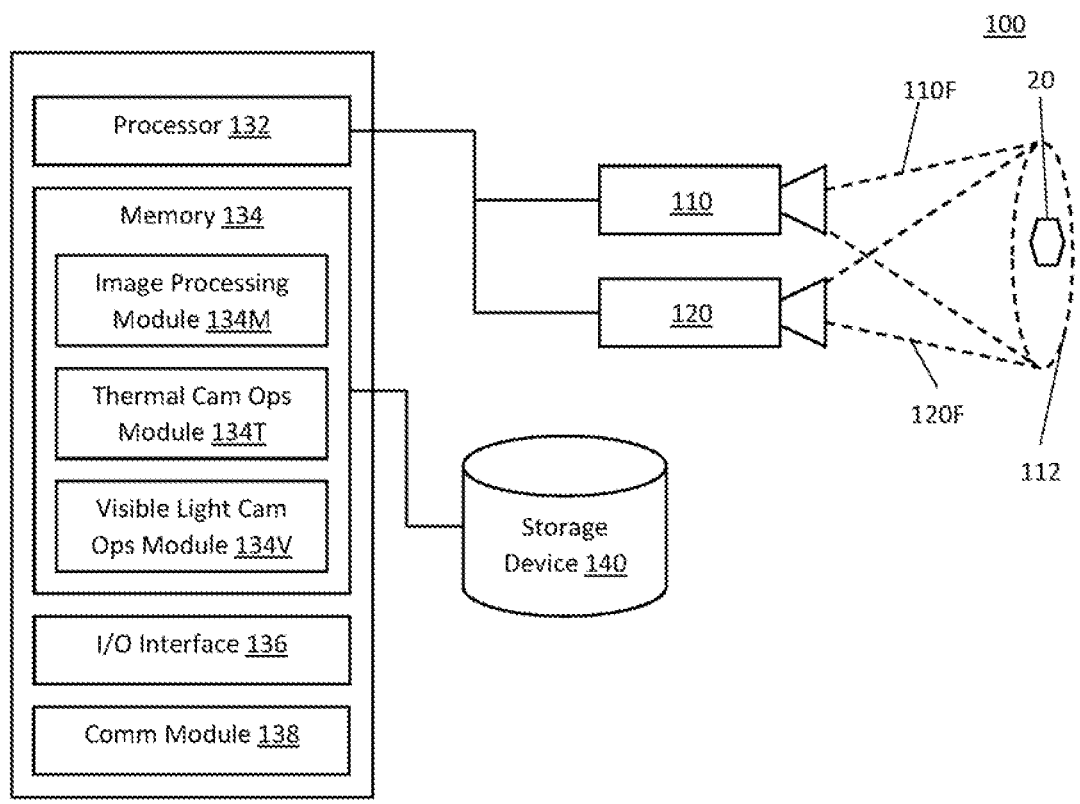
FIG. 1 shows a schematic diagram of an exemplary embodiment of a system for detecting a foreign object on a runway.

FIG. 1 shows a schematic diagram of an exemplary embodiment of a system 100 for detecting a foreign object 20 on a runway. System 100 includes a thermal camera 110 having a first field of view 110F and adapted to capture a thermal image 110M of a first view of an area of interest 112 on the runway from one side of the runway, a visible light camera 120 having a second field of view 120F and adapted to capture a visible light image of the first view of the area of interest 112 on the runway from the one side of the runway, such that the first field of view 110F overlaps the second field of view 120F, a processor 132 in communication with the thermal camera 110M and the visible light camera 120M, a memory 134 in communication with the processor 132 for storing instructions executable by the processor 132, such that the processor 132 is configured to transform at least one of the visible light image and the thermal image to a transformed visible light image and a transformed thermal image respectively, wherein the transformed visible light image and the transformed thermal image are of a second view of the area of interest, detect a thermal object image in the thermal image, detect a visible light object image in the visible light image, and determine that the foreign object 20 is detected when the thermal object image and the visible light object image are detected in the thermal image and the visible light object image respectively. System 100 may include a server comprising the processor 132, the memory 134, an I/O interface 136 configured to provide an interface between the processor 132 and peripheral interface modules, e.g. keyboard, mouse, touchscreen, display, etc. System 100 may include a communication module 138 configured to facilitate communication, wired or wirelessly, between the system 100 and other user devices, e.g. mobile devices, laptops, via the internet. System 100 may include a storage device 140 configured to store data. System 100 may include a display, e.g. monitor, touchscreen, for displaying signals, e.g. alert signal, images, etc. to the operator. System 100 is configured to detect a foreign object, debris (FOD), on a runway, a taxiway, aprons, ramps, etc. under both day and night ambient light condition without assisted illumination, e.g. visible spectrum illumination, infrared illumination, laser illumination.

Figure 1A:
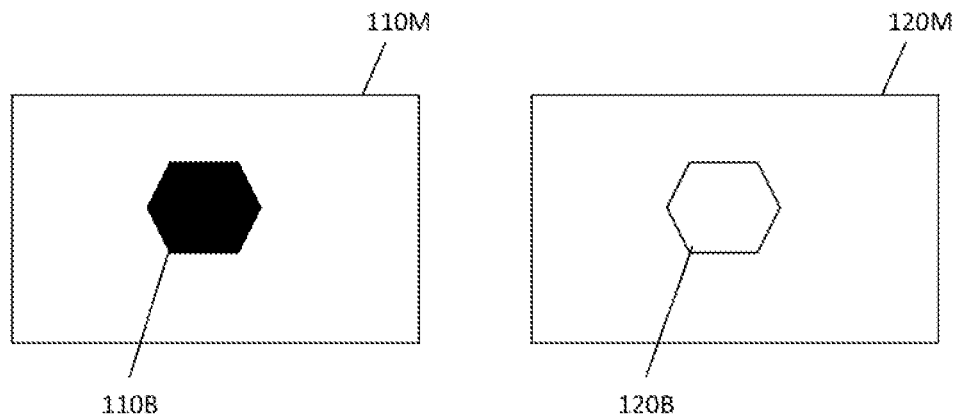
FIG. 1A shows a schematic diagram of the visible light image with the visible light object image of the foreign object therein and the thermal image with the thermal object image of the foreign object therein.

FIG. 1A shows a schematic diagram of the visible light image 120M with the visible light object image 120B of the foreign object 20 therein and the thermal image 110M with the thermal object image 110B of the foreign object 20 therein.

System 100 may include an image processing module 134M (see FIG. 1) configured to process images 110T, 120T captured from the thermal camera 110 and visible light camera 120. System 100 may include a thermal camera operating module 134T containing operating parameters of the thermal camera 110 for operating the thermal camera 110. System 100 may include a visible light camera operating module 134V containing operating parameters of the visible light camera 120 for operating the visible light camera 120. The modules 134T, 134V, 134M may be stored in the storage device 140 and loaded into the memory 134 to be processed by the processor 132. Image processing module 134 may be configured to transform the visible light image and/or the thermal image into the transformed visible light image and the transformed thermal image.

Upon capturing the thermal image 110M and visible light image 120M, the images 110M, 120M may be transmitted to the processor 132 to be processed. Processor 132 may receive and process the thermal image 110M and the visible light image 120M to detect a foreign object 20 on the runway.

Figure 2A:
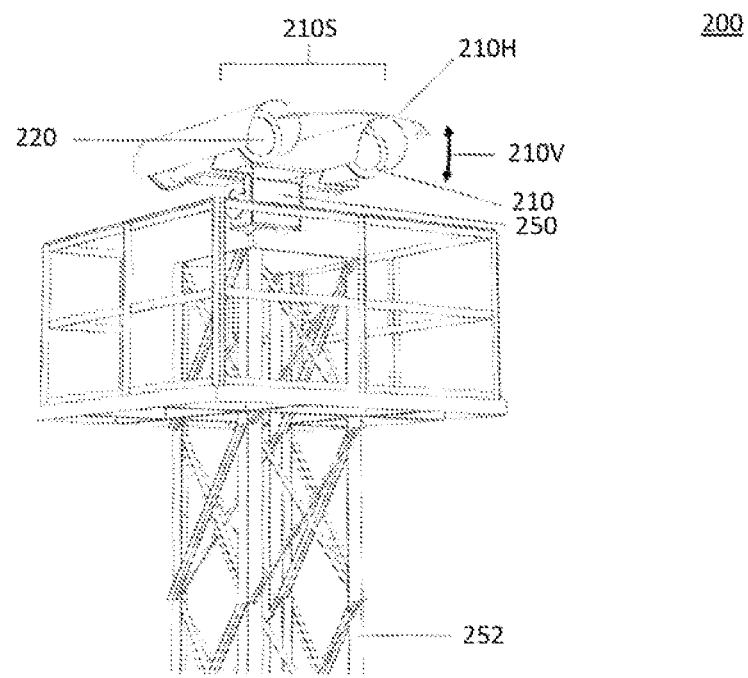
FIG. 2A shows an exemplary embodiment of the system.

FIG. 2A shows an exemplary embodiment of the system 200. System 200 may include a set of cameras, i.e. the visible light camera 220 and the thermal camera 210. The set of cameras 210S may be mounted rigidly on an actuator 250 adapted to move the set of cameras 210S. Set of cameras 210S may be controlled by the processor 132 to scan a sector of the runway to detect the foreign object 20 on the surface of the runway.

Actuator 250 may be a pan and tilt unit (PTU) adapted to pan and tilt the set of cameras 210S simultaneously so that the set of cameras 210S are able to have the same field of view and focus on the same area of interest. Actuator 250 may be adapted to pan the set of cameras 210S in the horizontal direction 210H and/or tilt the set of cameras 210S in the vertical direction 210V. Actuator 250 may be in communication with the processor 132 such that the processor 132 may be configured to remotely control the movement of the actuator 250 to pan and tilt the set of cameras 210S to scan the runway. Actuator 250 may be installed on top of a support 252, e.g. a mast structure, which is typically located along the runway. Support may be located at distance of 120 m-350 m from the centreline 304 (see FIG. 3) of the runway.

Figure 2B:
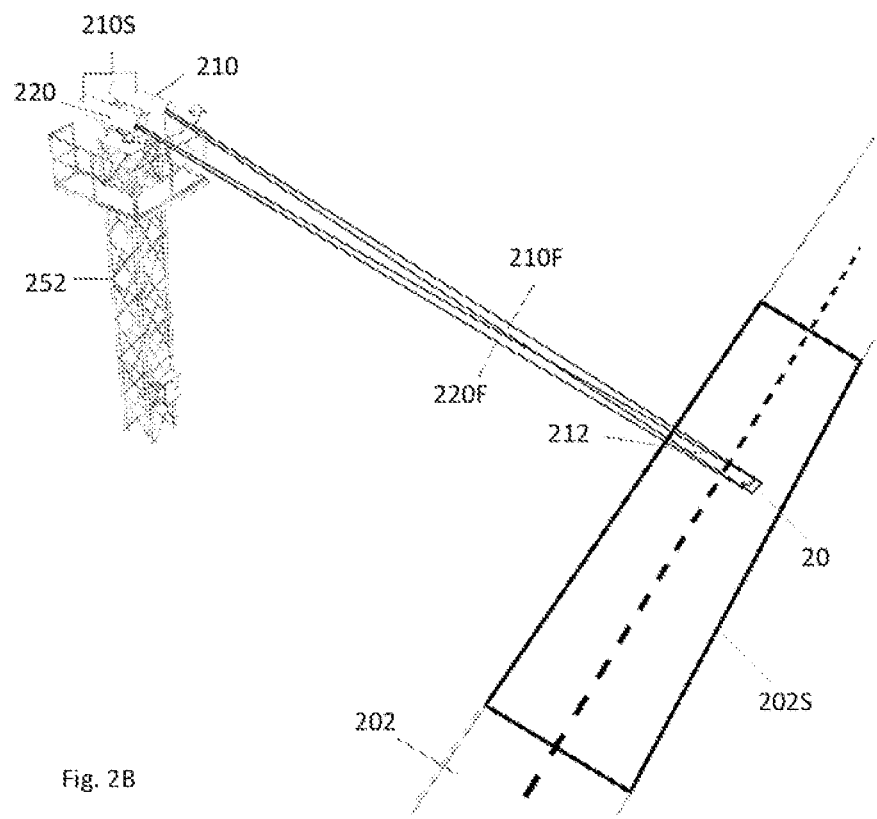
FIG. 2B shows the system in FIG. 2A scanning one of the plurality of sectors of the runway.

FIG. 2B shows the system 100 in FIG. 2A scanning one of the plurality of sectors 202S of the runway 202. Each set of cameras 210S may include the thermal camera 210 and the visible light camera 220, each having a field of view 210F, 220F and is adapted to capture an area of interest 212. Field of view 210F of the visible light camera 220 may overlap with the field of view 220F of the thermal camera 210. Both the field of views 210F, 220F of the visible light camera 220 and the thermal camera 210 may cover a specific area of interest 212 within the sector 202S of the runway 202. Hence, as a result of the overlapping field of views 210F, 220F, both the visible light camera 220 and the thermal camera 210 may detect the same foreign object 20 on the sector 202S of the runway at the same time while scanning the sector 202S.

Figure 2C:
FIG. 2C shows an exemplary embodiment of a first view of the area of interest.
Figure 2C:
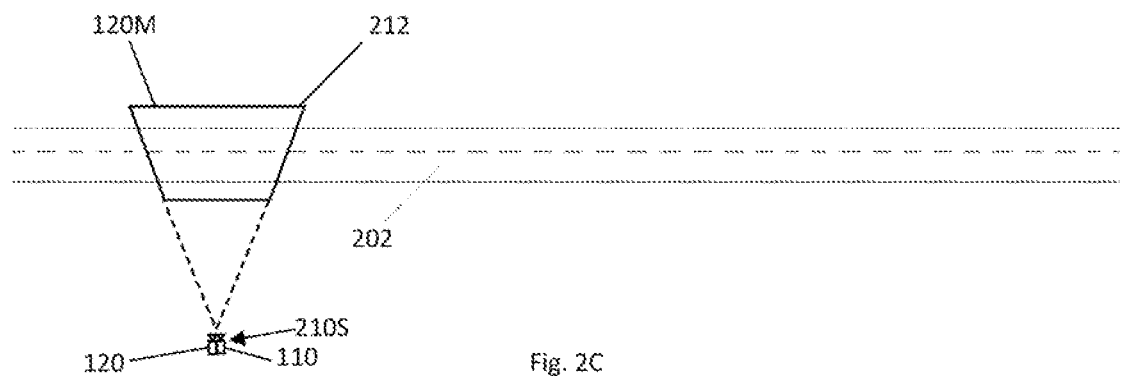

FIG. 2C shows an exemplary embodiment of a first view of the area of interest 212. First view may be a perspective view. Set of cameras 210S may be disposed on one side of the runway 202 to capture the first view of the area of interest 212. Set of cameras 210S may be disposed at a distance from the runway 202, e.g. 120 m-150 m from the centreline of the runway 202.

Figure 2D:
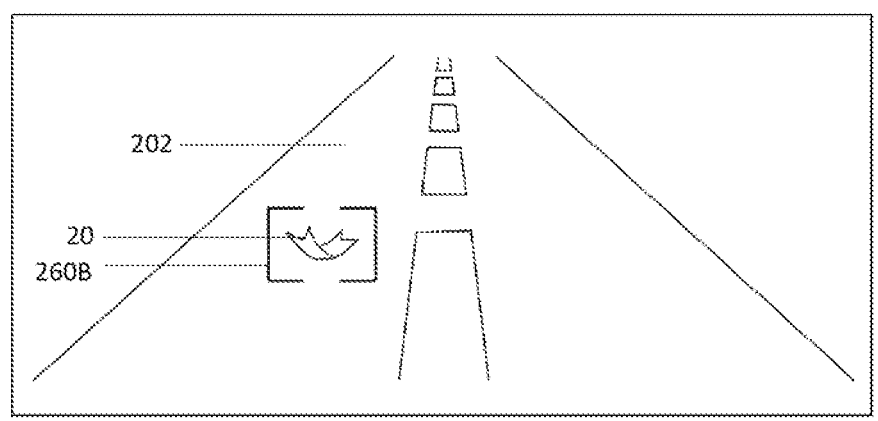
FIG. 2D shows an exemplary embodiment of a display second view of the area of interest.

FIG. 2D shows an exemplary embodiment of a display 260 second view of the area of interest 212. Display 260 may be disposed in the cockpit of the aircraft. Second view may be the cockpit view, which may be the view when the pilots see when they view out of the cockpit. As shown in FIG. 2D, the far end of the runway 202 is narrower than the near end of the runway 202 depicting the view that the aircraft is at the near end of the runway 202 viewing towards the far end of the runway 202. System 100 may detect the foreign object 20 on the runway 202 and display the foreign object 20 on the display 260 installed in the cockpit of the aircraft. Foreign object 20 may be highlighted with a graphical box 260B to make the foreign object 20 more obvious to the pilot so that the appropriate precautions can be taken to avoid the foreign object 20. The pilot may choose to delay the landing procedure until the foreign object 20 is cleared from the runway or other ways of avoiding the foreign object 20.

System 100 may be deployed to augment live footage and images of the airside of the airport captured by the aircraft to generate ancillary, augmented reality footage and images of it to aid the pilots to see the runway 202 better. System 100 may augment the visible light object image 120B and/or thermal object image 110B onto live footage captured by the aircraft. The augmentation of footage of the runway 202 captured by the system 100 enables the footage to appear as though it was shot from the perspective of the cockpit of a landing aircraft, based on its relative location of the aircraft to the runway 202. This information may then be transmitted live to the cockpit of the approaching aircraft to aid its pilot in landing.

As the high-definition visible light images and/or hyperspectral thermal images captured by the system are better able to depict the runway 202 than that seen by the human in low visibility conditions, e.g. fog, mist, rain, and lowlight, the augmented reality images transmitted to the display 260 will allow the pilot to view the runway 202 with greater clarity and resolution than an aircraft without the system 100. The augmented footage can also be overlaid with useful information for the pilot such as the presence of confirmed foreign object on the runway 202. System 100 enables detection of a foreign object 20 for airports with Cat II visibility, Cat Ma visibility, Cat IIIb visibility and Cat IIIc visibility.

Figure 3:
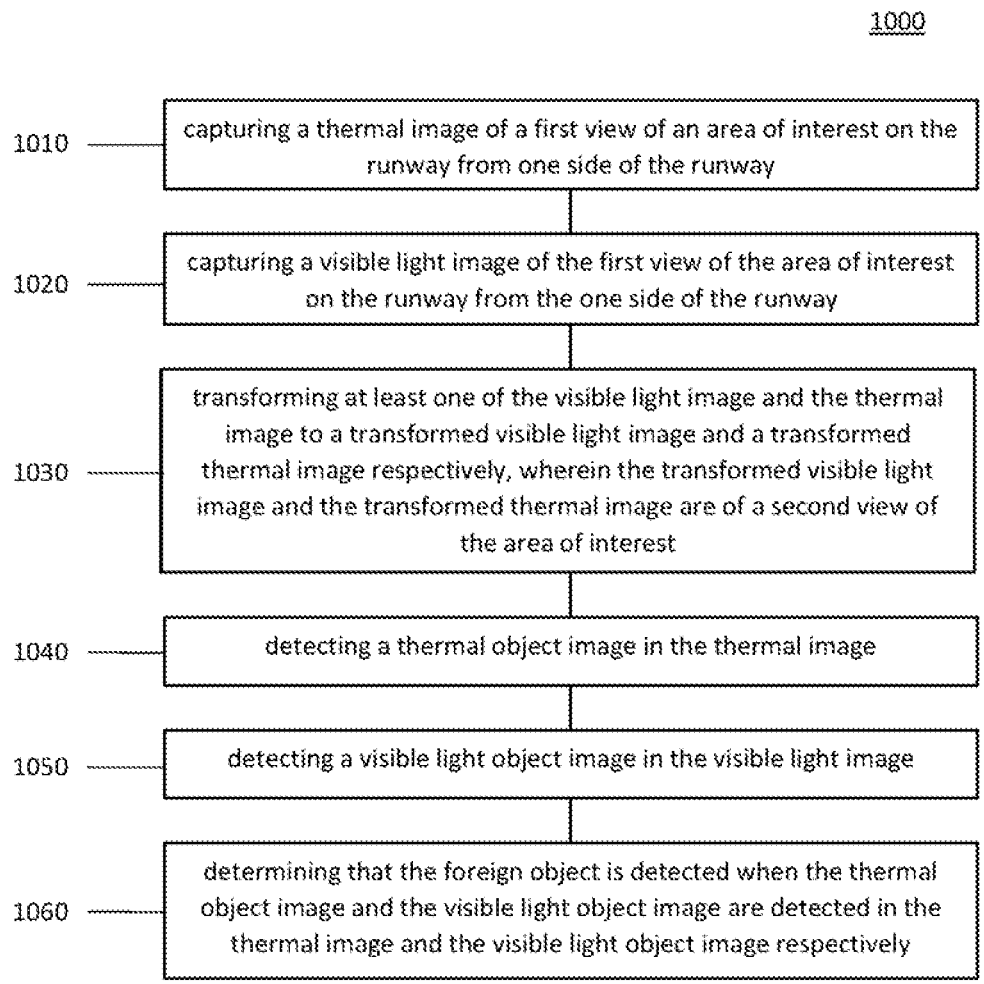
FIG. 3 shows a flow diagram of an exemplary method for detecting a foreign object on a runway.

FIG. 3 shows a flow diagram of an exemplary method 1000 for detecting a foreign object on a runway 202. Method includes capturing a thermal image 110M of the first view of an area of interest 112 on the runway 202 from one side of the runway in block 1010, capturing a visible light image 120M of the first view of the area of interest 112 on the runway in block 1020 from the one side of the runway 202, transforming at least one of the visible light image 120M and the thermal image 110M to a transformed visible light image and a transformed thermal image respectively, such that the transformed visible light image and the transformed thermal image are of a second view of the area of interest 112 in block 1030, detecting a thermal object image 110B in the thermal image 110M in block 1040, detecting a visible light object image 120B in the visible light image 120M in block 1050, and determining that the foreign object 20 is detected when the thermal object image 110B and the visible light object image 120B are detected in the thermal image 110M and the visible light object image 120B respectively in block 1060. Thermal object image 110B may be a portion of the thermal image 110M representing the foreign object 20 in the thermal image 110M and may be casually known as the foreign object 20 in the thermal image 110M. Visible light object image 120B may be a portion of the visible light image 120M representing the foreign object 20 in the visible light image 120M and may be casually known as the foreign object 20 in the visible light image 120M.

Before capturing the thermal image 110M and visible light image 120M, the method may include scanning the runway with the thermal camera 110 and the visible light camera 120. As the thermal camera 110 and the visible light camera 120 scan a sector of the runway, the thermal camera 110 and the visible light camera 120 captures thermal images 110M and visible light images 120M of a plurality of area of interests 112 along the sector. To detect the foreign object 20, the image processing module 134M may process the thermal image 110M and the visible light image 120M to determine if the foreign object 20 is present in the thermal image 110M and the visible light image 120M. Upon detecting the foreign object 20, the image processing module 134M may be configured to identify the thermal object image 110B and the visible light object image 120B within the thermal image 110M and the visible light image 120M respectively. Upon identifying the foreign object 20, the system 100 may generate an alert signal.

Figure 3A:
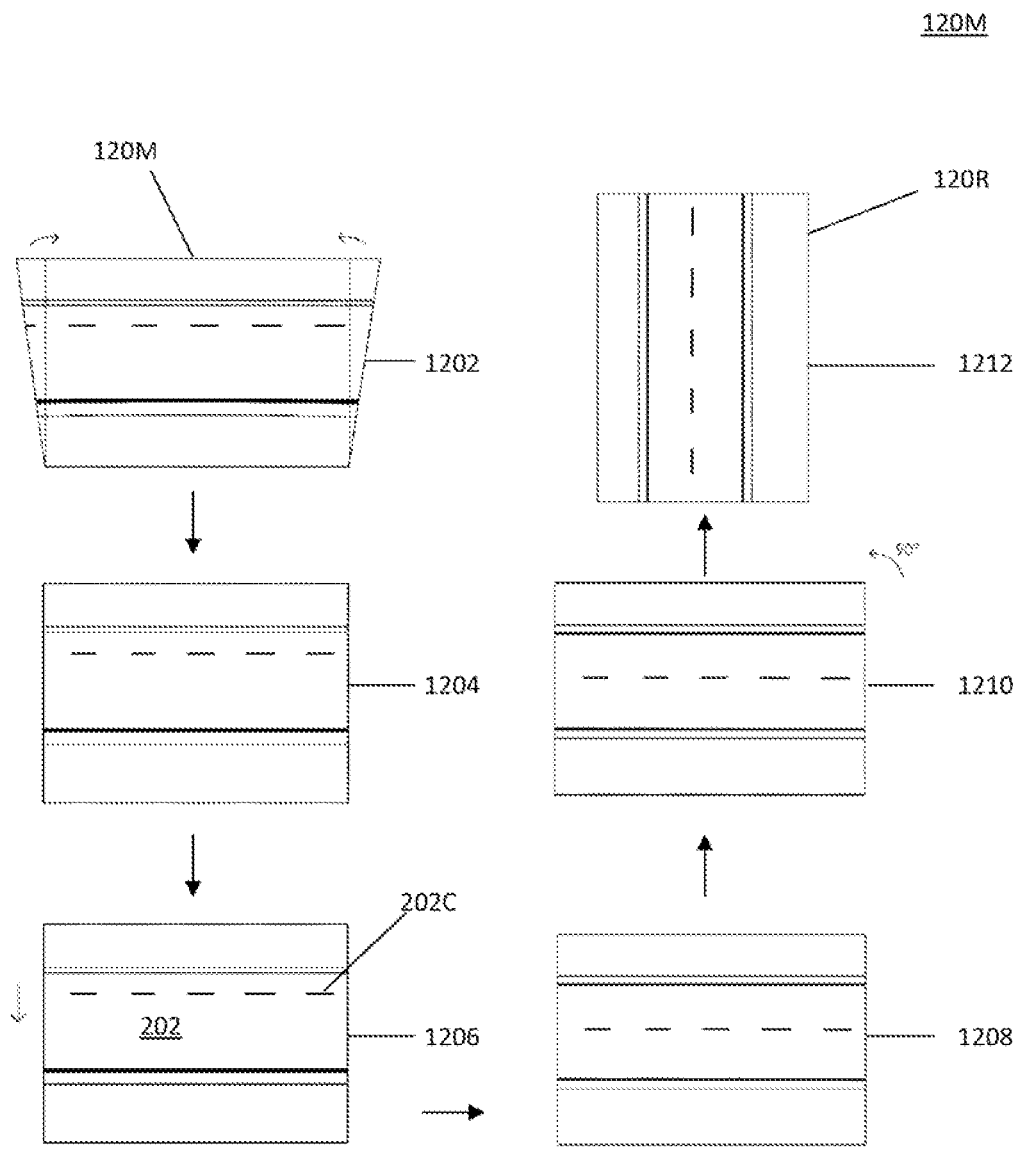
FIG. 3A shows an exemplary embodiment of the visible light image or the thermal image undergoing transformation to the rotated visible light image or the rotated thermal image

FIG. 3A shows an exemplary embodiment of the visible light image 120M or the thermal image 110M undergoing transformation to the rotated visible light image 120T or the rotated thermal image 110R. The same transformation may be applicable to the transformation of the thermal image 110M to the transformed thermal image. Referring to FIG. 2C, the visible light image 120M may be captured by the visible light camera 120. Referring to FIG. 3A, the processor 132 may receive the visible light image 120M. Processor 132 may run the image processing module 134M to transform the images. Processor 132 may be configured to warp the visible light image 120M (as shown by the curved arrows) at 1202 to obtain a warped visible light image at 1204. Processor 132 may be configured to recognise and adjust details in the visible light image 120M at 1206. For example, the processor 132 may shift the centreline 202C of the runway 202 downwards to centralise the centreline 202C along the centre of the runway 202 so that the visible light image of the runway 202 may resemble a top view of the runway 202 as shown in 1208. Processor 132 may detect the visible light object image (not shown in FIG. 3A) and shift the visible light object image accordingly in the vertical direction, i.e. perpendicular to the centreline. Processor 132 may be configured to rotate the visible light image 120M, e.g. 90 degrees counter-clockwise, at 1210 to a rotated visible light image 120R at 1212. Processor 132 may be configured to warp the visible light image 120M at 1212 to transform the visible light image 120M towards the transformed visible light image 120T to depict the runway in the perspective view as shown in FIG. 2D. Processor 132 may be configured to display at least one of the transformed visible light image 120T and the transformed thermal image 110T in the display 260 (not shown in FIG. 3A) in the cockpit of an aircraft. Transformed visible light image 1202T and the transformed thermal image 110T may be an image of one of the plurality of sectors 202S of the runway 202. The transformation may be performed on the visible light object image 120B and/or the thermal object image 110B.

To detect the foreign object 20, the method may include generating at least one attribute of the foreign object 20 in each of the thermal object image 110B and visible light object image 120B, comparing the at least one attribute of the foreign object 20 in the thermal object image 110B and the visible light object image 120B, such that the foreign object 20 is detected when the at least one attribute of the foreign object 20 in thermal object image 110B and the visible light object image 120B are the same or within a specified parameter or threshold level. System 100 may be configured to obtain an enlarged thermal object image 110B and an enlarged visible light object image 120B when the foreign object 20 is detected by zooming the visible light camera 120 and thermal camera 110 onto the detected foreign object 20.

Figure 3B:
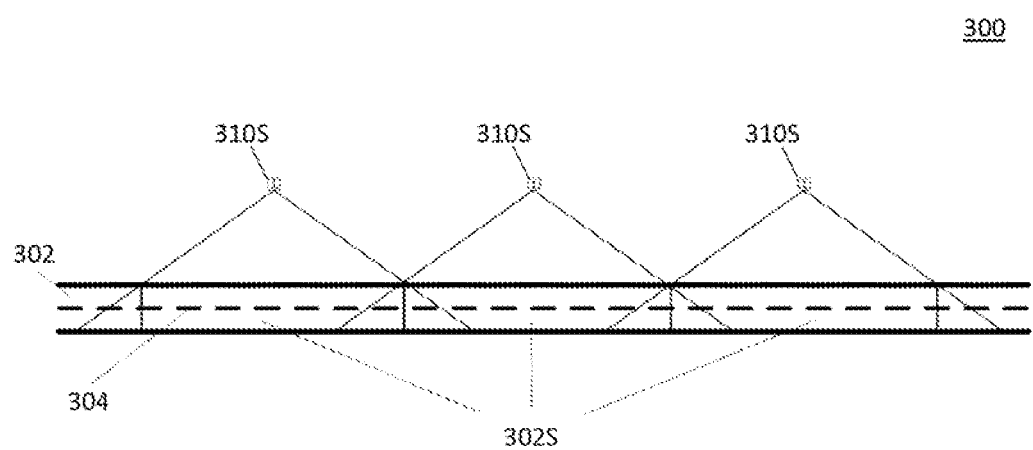
FIG. 3B shows an exemplary embodiment of a system for detecting a foreign object on a runway divided into a plurality of sectors.

FIG. 3B shows an exemplary embodiment of a system 300 for detecting a foreign object on a runway 302 divided into a plurality of sectors 302S. System 300 includes a plurality of sets of cameras 310S spaced apart from each other. Each of the plurality of sets of cameras 310S includes a thermal camera 210 having a first field of view 210F and adapted to capture a thermal image 110M of the first view of an area of interest 212 on the runway 302 from one side of the runway 302, a visible light camera 220 having a second field of view 220F and adapted to capture a visible light image 120M of the first view of area of interest 212 on the runway 302, from the one side of the runway 302 such that the first field of view 210F overlaps the second field of view 220F. System 300 further includes a processor 132 in communication with the plurality of visible light cameras 220 and the plurality of thermal cameras 210, a memory in communication with the processor 132 for storing instructions executable by the processor, such that the processor is configured to transform at least one of the visible light image and the thermal image to a transformed visible light image and a transformed thermal image respectively, such that the transformed visible light image and the transformed thermal image are of a second view of the area of interest, detect a thermal object image 110B in the thermal image 110M, detect a visible light object image 120B in the visible light image 120M, and determine that the foreign object 20 is detected when the thermal object image 110B and the visible light object image 120B are detected in the thermal image 110M and the visible light object image 120B respectively, such that each of the plurality of a set of cameras 310S is configured to scan one of the plurality of sectors 302S of the runway 302. As shown in FIG. 3, the runway 302 may be divided into a plurality of sectors 302S. Each of the plurality of sets of cameras 310S may scan one of the plurality of sectors 302S to detect any foreign object 20 on the surface of the respective sector 302S. Each of the plurality of sectors 302S may be further divided into a plurality of subsectors. Each set of cameras 310S may be operable to scan a dedicated sector 302S and scan the sector 302S, subsector by subsector. In this way, when a foreign object 20 is detected, the system 300 is able to identify the sector 302S based on the set of cameras 310S scanning the sector 302S. Set of cameras 310S may scan the sector 302S in a specific typical scan direction, e.g. from the left-most subsector to the right-most subsector or the right-most subsector to the left-most subsector.

Figure 4:
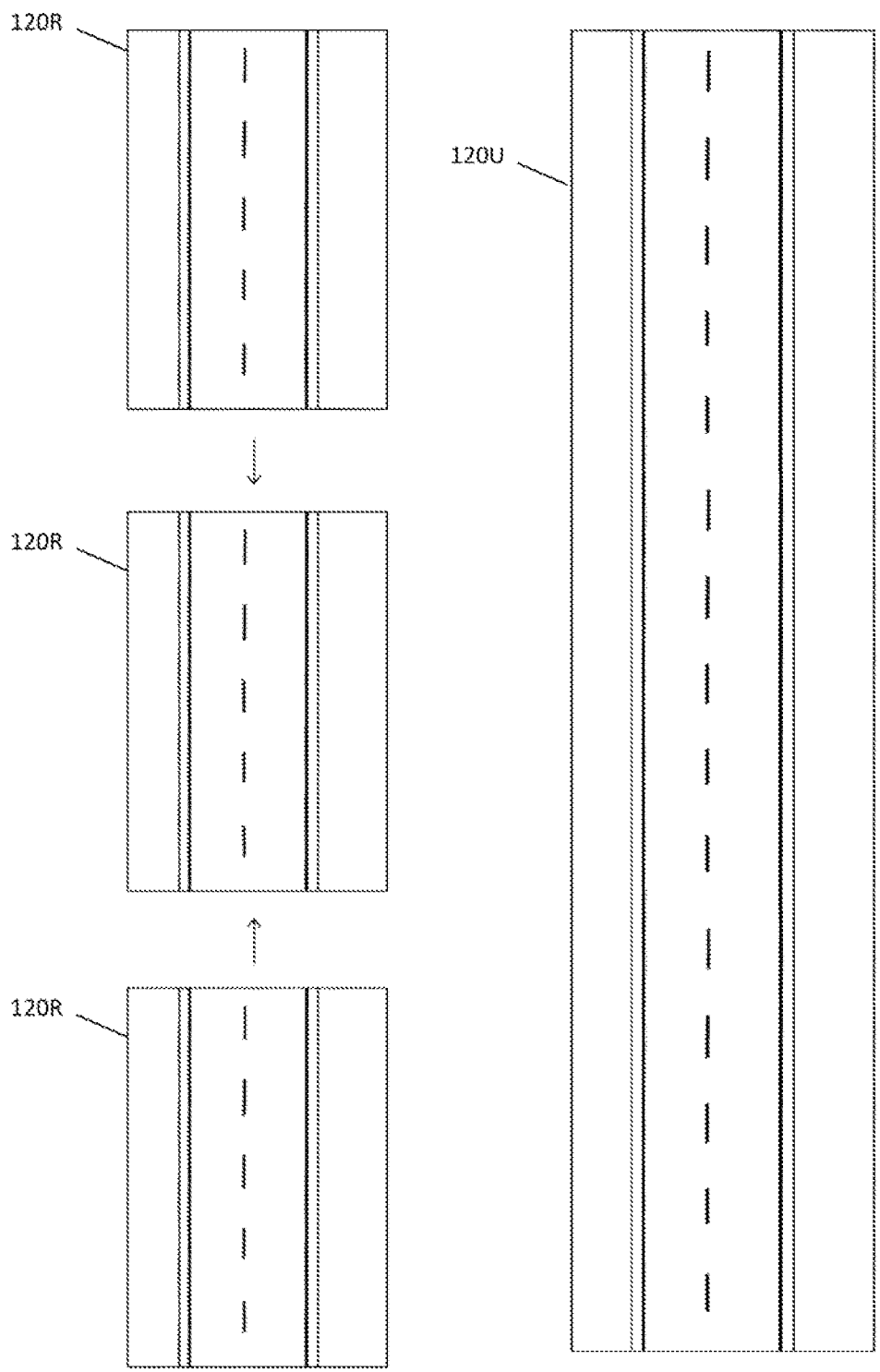
FIG. 4 shows an exemplary embodiment of a plurality of rotated visible light image or a plurality of rotated thermal images stitched to form a unitary visible light image or a unitary thermal image respectively.

FIG. 4 shows an exemplary embodiment of a plurality of rotated visible light image 120R or a plurality of rotated thermal images 110R stitched to form a unitary visible light image 120U or a unitary thermal image 110U respectively. Plurality of sets of cameras 210S may capture a plurality of visible light images 120M of the first view of the area of interest 212 on the runway 202 from the one side of the runway 202 and a plurality of thermal images 110M of the first view of the area of interest 212 on the runway 202 from one side of the runway 202. Processor 132 may transform at least one of the plurality of visible light images 120M and the plurality of thermal images 110M to a plurality of transformed visible light image 120T and a plurality of transformed thermal images 110T respectively, such that the plurality of transformed visible light images and the plurality of transformed thermal images are of a second view of the area of interest. As shown in FIG. 4, the processor 132 may run the image processing module 134M to stitch the plurality of rotated visible light images 120R to form a unitary visible light image 120U and/or stitch the plurality of rotated thermal images 110R to form a unitary thermal image 110U. Hence, the plurality of rotated visible light images 120R and the plurality of rotated thermal images 110R depict the plurality of sectors 202S and, when stitched together, the unitary visible light image 120U and the unitary thermal image 110U depict the runway 202 from the top view. As mentioned, the processor 132 may warp the unitary visible light image 120U and/or the unitary thermal image 110U to form the second view, i.e. the cockpit view, of the runway 202.

Figure 4A:
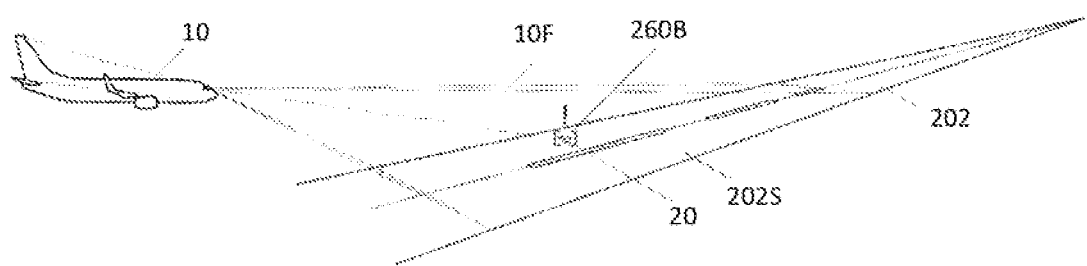
FIG. 4A shows a perspective view of the aircraft along the final approach flight path of the aircraft.

FIG. 4A shows a perspective view of the aircraft 10 along the final approach flight path of the aircraft. As shown in FIG. 4A, the cockpit view 10F of the aircraft 10 overlaps a sector 202S of the runway 202. When the transformed visible light image 120T and/or the transformed thermal image 110T is displayed on the display 260, the pilot is able to see the foreign object from the display in the cockpit of the aircraft 10. The attention of the pilot is brought to the graphical box 260B to enable the pilot to spot the foreign object 20.

System 100 may receive the location co-ordinates of the aircraft 10, e.g. 3D position, GPS co-ordinates, along the runway 202. Based on the location of the aircraft 10, the system 100 may be configured to identify the transformed visible light image and/or the transformed thermal image that represents the view from the cockpit of the aircraft 10 and transmit the images to the display 260 in the cockpit. The images may include location co-ordinates stored as metadata embedded therein. The location co-ordinates may be the location of the set of cameras 210S and/or the area of interest 212 captured in the images. System 100 may be configured to process based on the location co-ordinates of the aircraft and the images and identify the images that are in the second view, i.e. the cockpit view, and transmit the images to the display 260. If the images include the visible light object image 120B and a thermal object image 110B of the foreign object 20, the pilot would be able to see the foreign object 20 in the display 260.

Thermal camera 210 detects foreign object 20 on the runway 302 by detecting the difference in thermal radiation level (or temperature) between the foreground, i.e. foreign object 20, and the background, i.e. the runway surface. Thermal camera 210 operates in the infrared spectrum and does not require any ambient light to enable it to "see" the foreign object 20. Thermal camera 210 may also be commonly known as infrared thermal camera. Thermal camera 210 may be a Mid Wave Infrared (MWIR) camera or a Long Wave Infrared (LWIR) camera. Thermal camera 210 provides the advantage to detect the foreign object 20 on the runway 302 under very low visibility conditions and even under zero illumination conditions, i.e. total darkness. Hence, the thermal camera 210 provides the advantage of the ability to detect the foreign object 20 on the runway 302 even under foggy weather conditions. Thermal camera 210 may capture and transmit images and video output in monochrome to the processor 132. Thermal camera 210 is entirely passive with no active transmissions or emissions, e.g. radio frequency, microwave, artificial illumination, infrared, laser and LIDAR, etc. As such, the thermal camera 210 offers the following advantages, e.g. no interference with existing airport systems/equipment and aircraft systems/equipment, no interference with future airport systems/equipment and aircraft systems/equipment, no licensing and approval of frequency/spectrum required from airport and frequency spectrum regulator.

Unlike the thermal camera 210, the visible light camera 220 operates within the visible spectrum of light and hence requires some minimum amount of ambient visible spectrum light to enable it to "see" the foreign object 20 on the runway 302. Visible light camera 220 is not able to detect any foreign object 20 when the visibility conditions are too poor or under zero illumination conditions. For example, the visible light camera 220 is also not able to detect the foreign object 20 when the visibility condition (above the runway surface) is very poor or in the presence of fog (above the runway surface). Visible light camera 220 is able to capture and transmit full colour and high-resolution images/video, e.g. Full HD (FHD) or 4K Ultra HD (4K UHD) resolution. The colour images in high resolution enables reliable and accurate visual verification and confirmation of the detected foreign object 20 by an operator, as well as reliable and accurate recognition/classification of the detected foreign object 20 by the system 300. Therefore, the combined use of both the visible light camera 220 and the thermal camera 210 enables the system 300 to operate under very low visibility conditions, e.g. foggy weather conditions, to enable the system 300 to detect foreign object 20 on the runway 302 surface accurately and reliably. Visible light camera 220 is configured to capture and output visible light image 120M in colour and high resolution to the processor 132. Visible light camera 220 does not require any transmission of infrared illumination, visible spectrum illumination or laser illumination to operate. Being passive, the system 300 provides the advantage that it does not pose any hazard or cause any interference to other airport systems and/or aircraft systems, e.g. for aircraft landing/taking-off from the runway 302. System 300 provides the following advantages, no interference with existing airport systems/equipment and aircraft systems/equipment, no interference with future airport systems/equipment and aircraft systems/equipment, no licensing and approval of frequency/spectrum required from airport and frequency spectrum regulator.

Figure 5:
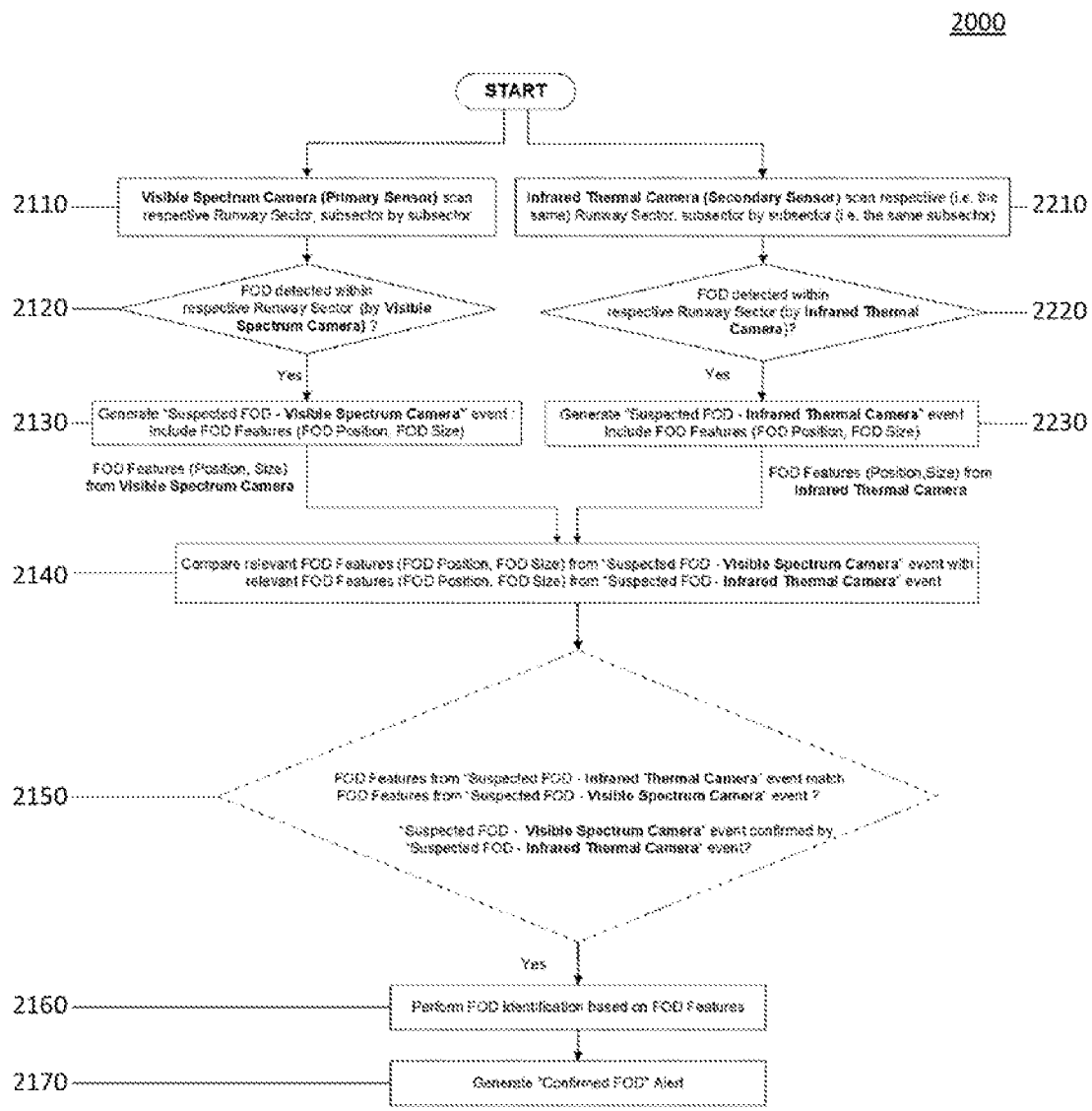
FIG. 5 shows a flow diagram of an exemplary method for detecting the foreign object on a runway.

FIG. 5 shows a flow diagram of an exemplary method 2000 for detecting the foreign object 20 on a runway. System 100 may be configured to designate the visible light camera 120 to be a primary detector and the thermal camera 110 to be a secondary detector. Referring to FIG. 5, in block 2110, the visible light camera 120 may be configured to scan one of the plurality of sectors on the runway. Visible light camera 120 may be configured to scan a subsector by subsector of the sector. Visible light camera 120 may capture a plurality of visible light images 120M within each sector. Plurality of visible light images 120M may be processed by the image processing module 134M to detect the foreign object 20. In block 2210, the thermal camera 110 may be configured to scan the same sector on the runway scanned by the visible light camera 120. Thermal camera 110 may be configured to scan a subsector by subsector of the sector. Thermal camera 110 may capture a plurality of thermal image 110Ms within the same sector. Plurality of thermal images 110M may be processed by the image processing module 134M to detect the foreign object 20. Thermal camera 110 and the visible light camera 120 may be configured to scan the sector concurrently. Image processing module 134M for the visible image and thermal image 110M may be separate modules for processing the visible light image 120M and thermal image 110M respectively.

In block 2120, the system 100 may detect a foreign object 20 after processing the visible light image 120M. System 100 may identify the visible light object image 120B within the visible image. In block 2220, the system 100 may detect a foreign object 20 after processing the thermal image 110M. System 100 may identify the thermal object image 110B within the thermal image 110M. Thermal image 110M and the visible light image 120M may be processed by the processor 132 concurrently. If the system 100 detects a foreign object 20 in the visible light image 120M, the system 100 may generate a "Suspected FOD" alert signal to inform the operator that a foreign object 20 has been detected in the visible light image 120M in block 2130. Similarly, if the system 100 detects a foreign object 20 in the thermal image 110M, the system 100 may generate a "Suspected FOD" alert signal to inform the operator that a foreign object 20 has been detected in the thermal image 110M in block 2230 as the detection of the foreign object 20 has yet to be verified. The "Suspected FOD" signal may be generated for each of the visible light image 120M and the thermal image 110M. System 100 may display the thermal object image 110B and/or the visible light object image 120B on the display for the operator to view. System 100 may generate at least one attribute of the visible light object image 120B and of the thermal object image 110B. At least one attribute may include the position of the visible light object image 120B in the visible light image 120M, the position of the thermal object image 110B in the thermal image 110M, the size of the visible light object image 120B and/or the size of the thermal object image 110B. For example, the system 100 may generate the position of the visible light object image 120B in the visible light image 120M and the position of the thermal object image 110B in the thermal image 110M and/or the size of the visible light object image 120B and thermal object image 110B. In block 2140, the system 100 may be configured to determine whether the foreign object 20 is detected in the visible light image 120M and the thermal image 110M by comparing the at least one attribute of the visible light object image 120B and the thermal object image 110B. Details of this comparing step may be shown in FIG. 7. If the attributes of the visible light object image 120B and the thermal object image 110B matches in block 2150, the system 100 determines that the foreign object 20 is detected in the visible light image 120M and the thermal image 110M. System 100 may receive an operator verification input via the peripheral interface module to verify the detection of the foreign object 20 after viewing the visible light image 120M and/or thermal image 110M on the display. System 100 may identify the foreign object 20 based on the at least one attributes in block 2160. Once the foreign object 20 has been detected and/or identified, the system 100 may generate an alert signal, e.g. a "Confirmed FOD" signal in block 2170. Otherwise, the system 100 may generate a "No Confirmed FOD" alert signal. System 100 may transmit the alert signal to an operator's mobile device or display the alert signal on the display for the operator's viewing. System 100 may generate the alert signal upon receiving the operator verification input that the foreign object 20 is detected.

Figure 6:
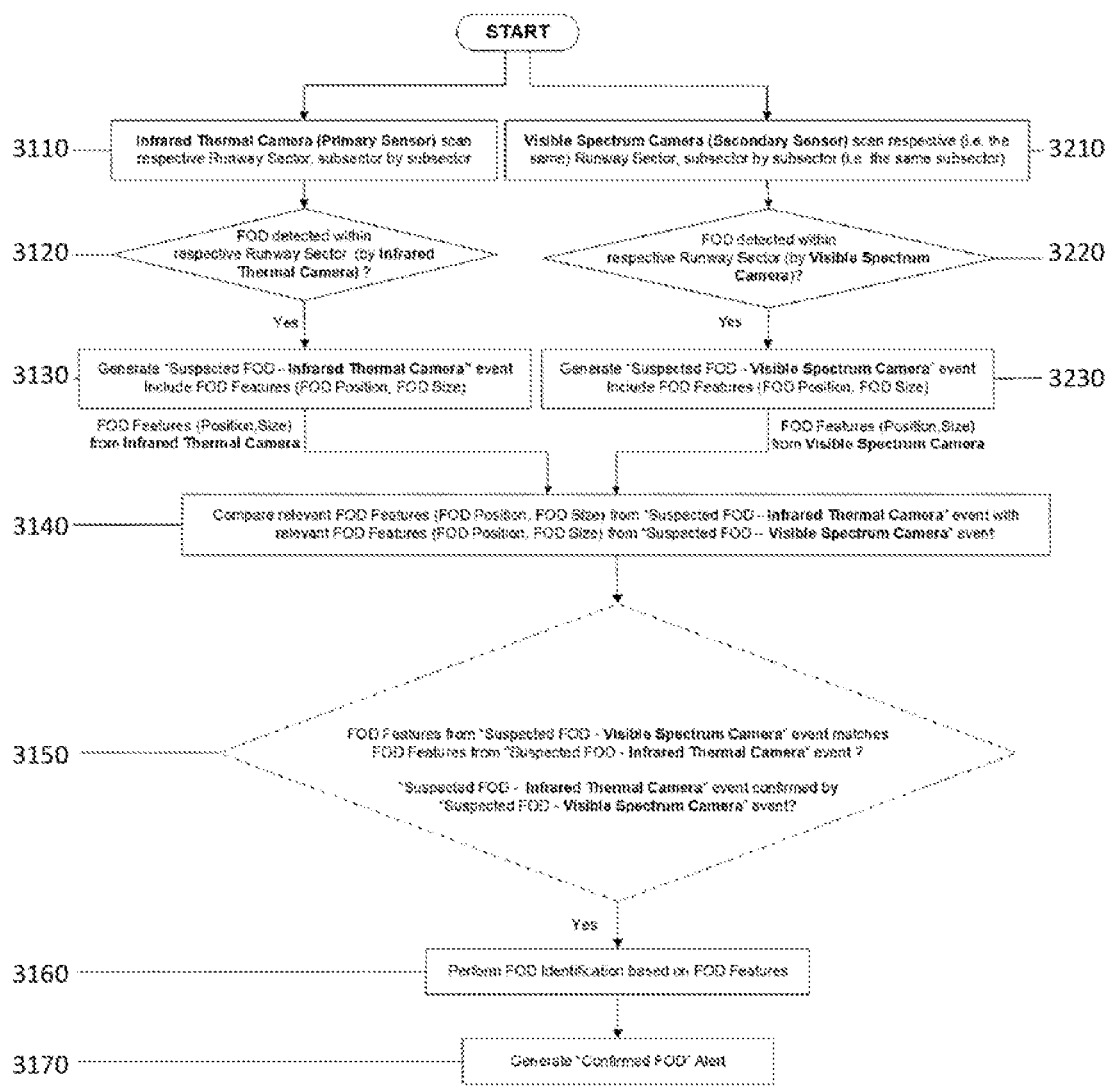
FIG. 6 shows a flow diagram of an exemplary method for detecting the foreign object on a runway.

FIG. 6 shows a flow diagram of an exemplary method 3000 for detecting the foreign object 20 on a runway. Method 3000 is identical to method 2000 in FIG. 5 except that the system 100 is configured to designate the thermal camera 110 to be a primary detector and the visible light camera 120 to be a secondary detector. Like reference numerals in FIG. 5 and FIG. 6 represent the same steps. Referring to FIG. 6, in block 3110, the thermal camera 110 may be configured to scan one of the plurality of sectors on the runway. Thermal camera 110 may be configured to scan a subsector by subsector of the sector. Thermal camera 110 may capture a plurality of thermal images 110M within each sector. Plurality of thermal images 110M may be processed by the image processing module 134M to detect the foreign object 20. In block 3210, the visible light camera 120 may be configured to scan the same sector on the runway scanned by the thermal camera 110. Visible light camera 120 may be configured to scan a subsector by subsector of the sector. Visible light camera 120 may capture a plurality of visible light images 120M within the sector. Plurality of visible light images 120M may be processed by the image processing module 134M to detect the foreign object 20. Thermal camera 110 and the visible light camera 120 may be configured to scan the sector concurrently. In block 3120, the system 100 may detect a foreign object 20 after processing the thermal image 110M. System 100 may identify the thermal object image 110B within the thermal image 110M. In block 3230, the system 100 may detect a foreign object 20 after processing the visible light image 120M. System 100 may identify the visible light object image 120B within the visible light image 120M. Thermal image 110M and the visible light image 120M may be processed by the processor 132 concurrently. Blocks 3140 to 3170 are identical to blocks 2140 to 2170 in FIG. 5.

Figure 7:
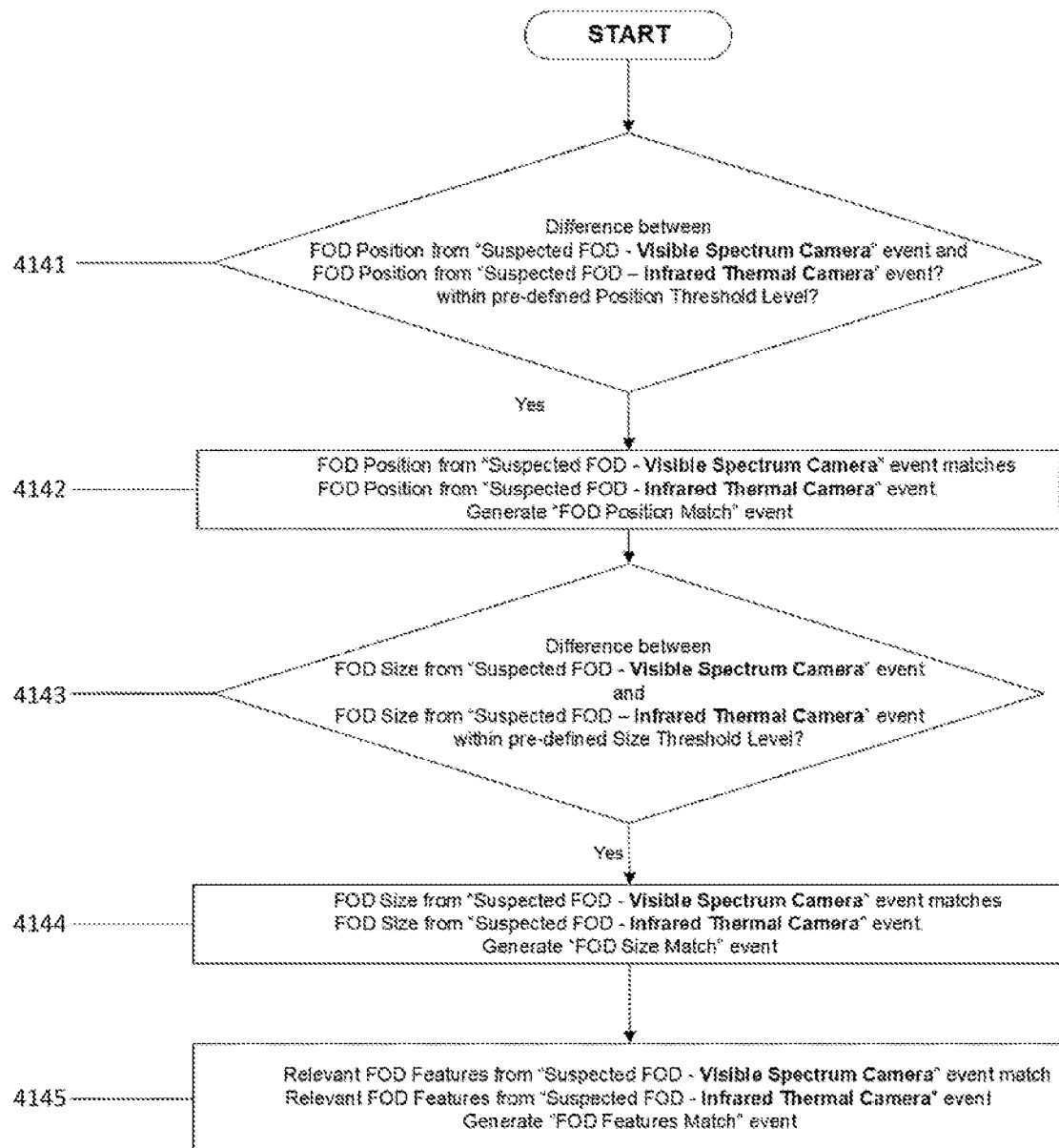
FIG. 7 shows a flow diagram of an exemplary method for comparing the at least one attribute of the foreign object in the thermal object image and the visible light object image.

FIG. 7 shows a flow diagram of an exemplary method 4140 for comparing the at least one attribute of the foreign object 20 in the thermal object image 110B and the visible light object image 120B. Method 4140 is used in method 2000 in FIG. 5 and method 3000 in FIG. 6 in block 2140 and block 3140 respectively. At least one attribute of the foreign object 20 may include the position of the thermal object image 110B in the thermal image 110M and the position of the visible light object image 120B in the visible light image 120M. In block 4141, the at least one attribute of the foreign object 20 in thermal object image 110B and the visible light object image 120B may be considered the same when the distance between the position of the thermal object image 110B in the thermal image 110M and the position of the visible light object image 120B in the visible light image 120M is within a position parameter. For example, the processor 132 identifies the positional difference between the positions of the visible light object image 120B and thermal object image 110B in the visible light image 120M and the thermal image 110M and the processor 132 determines if the positional difference between the positions are within a position parameter, i.e. a pre-defined position threshold level. Position parameter may be determined based on statistical analysis of the detected positions of all the detected foreign object 20 samples. If the positional difference is within the position parameter, the processor 132 may generate a "position match" alert signal in block 4142.

At least one attribute of the foreign object 20 may include the size of the thermal object image 110B and visible light object image 120B. In block 4143, the at least one attribute of the foreign object 20 in the thermal object image 110B and visible light object image 120B may be considered the same when the difference in the size of the thermal object image 110B in the thermal image 110M and the size of the visible light object image 120B in the visible light image 120M is within a size parameter. For example, the processor 132 identifies the size difference between the sizes of the visible light object image 120B and thermal object image 110B in the visible light image 120M and the thermal image 110M and the processor 132 determines if the size difference between the positions are within a size parameter, i.e. a pre-defined size threshold level. Size parameter may be determined based on statistical analysis of the measured sizes of all the detected foreign object 20 samples. If the size difference is within the size parameter, the processor 132 may generate a "size match" alert signal in block 4144.

Depending on the configuration of the system 100, the process may detect the foreign object 20 based on the position and/or size of the thermal object image 110B and visible light object image 120B. For example, where both the position and size of the thermal object image 110B and the visible light object image 120B are used, the foreign object 20 is detected when the position and size of the thermal object image 110B and visible light object image 120B are within the position parameter and size parameter respectively, i.e. matched. System 100 may generate an alert signal when the foreign object 20 is detected, e.g. generate an "attribute match" signal when the attributes are matched in block 4145. System 100 may generate the alert signal when the "position match" alert signal and "size match" alert signal is on or generated.

The exemplary system 100 and methods described above provide a solution that enables the detection of a foreign object 20 during adverse weather conditions and prevent or minimise false detection of the foreign object 20. For example, the reflections from water puddles or ponding after a rainfall, or the reflections on a smooth runway surface occur within the visible spectrum of light. As, the visible light camera 120 operates solely within the visible light spectrum, the system 100 may easily misinterpret these reflections as foreign objects 20, or "Suspected FOD". This would cause the system 100 to generate an invalid alert or false positive alarms. Therefore, by comparing and detecting the foreign object 20 using both the thermal image 110M and visible light image 120M, the system 100 is able to provide a more accurate detection of the foreign object 20 and prevent or minimise false detection of the foreign object 20.

Referring to the method 2000 in FIG. 5 and method 3000 in FIG. 6. When comparing the at least one attribute of the visible light object image 120B and the thermal object image 110B, the system 100 may determine that the detection of the foreign object 20 is not confirmed, i.e. the at least one attribute in the visible light object image 120B does not match the at least one attribute in the thermal image 110M. System 100 may then generate a "No Confirmed FOD" alert signal. In this situation, as the system 100 "suspected" that a foreign object 20 is detected, but identified that it is not "confirmed", the system 100 may be configured to identify this event as an invalid alert or false positive alert. Hence, the system 100 may be configured to store at least one of: the alert signal, attributes, features and the images of this event into a database, e.g. invalid alert database, for post-mortem analysis and investigation.

Figure 8:
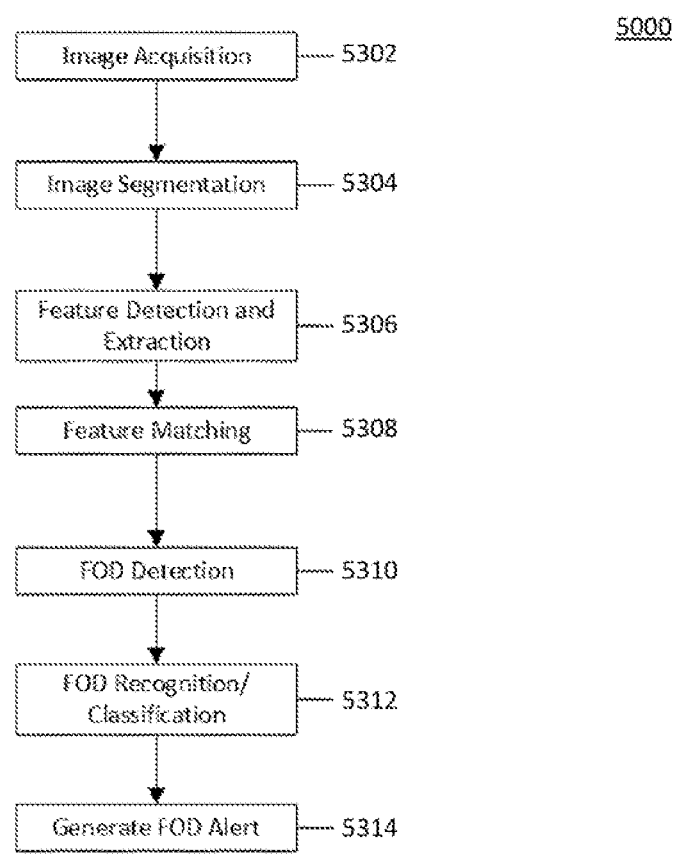
FIG. 8 shows a flow diagram of a method for identifying a foreign object on the runway.

FIG. 8 shows a flow diagram of a method 5000 for identifying a foreign object 20 on the runway. Image processing module 134M may be configured to carry out the method 5000. System 100 may store a plurality of reference feature vectors and an object category associated with each of the plurality of reference feature vectors in a reference feature vector database, which may be stored in the storage device 140. To identify the foreign object 20, the system 100 is configured to identify the object category of the foreign object 20. Referring to FIG. 8, the method may include capturing the visible light image 120M and the thermal image 110M via the visible light camera 120 and the thermal camera 110 in block 5302. To identify an object category of the foreign object 20 in the thermal image 110M, the method includes segmenting the thermal image 110M into a plurality of thermal image regions in block 5304. Method may include segmenting the visible light image 120M into a plurality of visible light image regions in block 5304. Segmenting the thermal image 110M may include labelling each pixel in the thermal image 110M and grouping the labelled pixels with the same characteristic into a plurality of groups to form the plurality of thermal image regions. Segmenting the visible light image 120M may include labelling each pixel in the visible light image 120M and grouping the labelled pixels with the same characteristic into a plurality of groups to form the plurality of visible light image regions. Processor 132 may be configured to assign a label to each pixel in the thermal image 110M and visible light image 120M such that the pixels with the same label share certain common characteristics or properties. Upon segmentation, the thermal image 110M and the visible light image 120M are made up of a plurality of thermal image regions and a plurality of visible light image regions that collectively cover the respective images. The pixels within each of the plurality of regions are similar with respect to some characteristic, feature or property, such as texture, colour, or intensity. Adjacent regions of the plurality of image regions are significantly different from each other with respect to the same characteristic. The segmented thermal image 110M and visible light image 120M may be used to detect and locate region or regions which may include the suspected foreign object in the images. In block 5306, the method may include detecting and extracting features from the thermal image 110M and visible light image 120M. System 100 may be configured to assign a feature vector to each of the plurality of thermal image regions, e.g. thermal feature vector, and each of the plurality of visible light image regions, e.g. visible light feature vector. A feature may refer to a pattern or distinct structure found in an image, such as a point, blob, small patch, corner, edge. Features are represented by an image region which differs from the image regions in its immediate surroundings, e.g. by texture, colour or intensity. Features may be extracted, grouped and represented by the feature vector. A foreign object 20 may be represented by a group of features, which may be represented by a feature vector.

In block 5308, the method may include comparing the feature vector to the plurality of reference feature vectors, such that each of the plurality of reference feature vectors is associated to an object category. System 100 may match the feature vector to the plurality of reference feature vectors in block 5308. Each object category, e.g. rubber tire, mechanic's tool, aircraft part, vehicle part, etc., may be represented by a specific reference feature vector stored in the reference feature vector database. Each extracted feature vector may be matched against the plurality of reference feature vectors in the reference feature vector database. In block 5310, the method may include detecting the foreign object 20. If there is a match between the feature vector and one or more of the plurality of reference feature vectors, the system 100 may determine that a foreign object 20 is detected. System 100 may generate a "Suspected FOD" alert signal. In block 2312, the method may include identifying the object category of the foreign object 20. System 100 may be configured to identify the reference feature vector closest to the feature vector and its object category. Based on the matched one or more of the plurality of reference feature vectors, the system 100 may identify or classify the foreign object 20 based on the closest match between the feature vector and the one or more of the plurality of reference feature vectors, e.g. the "shortest distance" between the feature vector and the specific reference feature vector. In addition, the "shortest distance" may be used to determine the match or probability of the foreign object 20 being classified accurately. There could potentially be more than one reference feature vector which may match the feature vector. The matching may be based on fuzzy matching. System 100 may be configured to recognise and classify the foreign object 20 based on the object category. System 100 may identify an object category of the foreign object 20 in the visible light image 120M. Based on the matched reference feature vector, the object category tagged to the matched reference feature vector may be retrieved and the foreign object 20 may be identified or classified. Upon identifying the foreign object 20, the system 100 may generate and transmit an alert signal.

Figure 9:
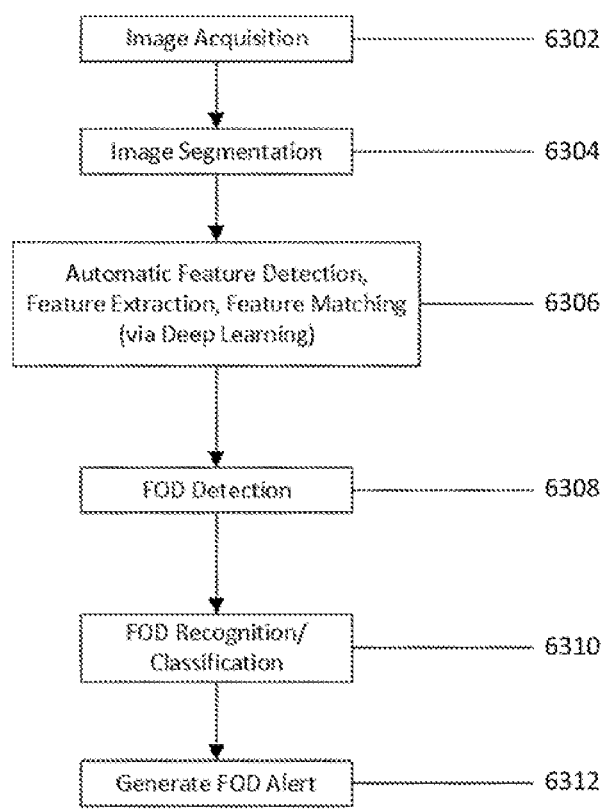
FIG. 9 shows a flow diagram of a method for identifying a foreign object on the runway.

FIG. 9 shows a flow diagram of a method 6000 for identifying a foreign object 20 on the runway. Method 6000 is identical to method 5000 in FIG. 8 except that the system 100 is configured to automatically detect and extract the features from the thermal image 110M and visible light image 120M, match the feature vector to the plurality of reference feature vectors and detecting the foreign object 20 in block 6306. Like reference numerals in FIG. 8 and FIG. 9 represent the same steps. System 100 may be configured to train the image processing module 134M using deep learning modules and automatically carry out the steps in block 6306.

Thermal camera 110 is able to detect foreign objects 20 by detecting the difference in the temperature, i.e. the infrared thermal radiation of the foreground, e.g. the foreign object 20, with respect to the background, e.g. the runway 202 surface. Different categories or types of foreign objects 20 are made of different materials, e.g. metallic, rubber, plastic, concrete, etc., and would have different energy absorptivity, reflectivity and emissivity. As such, different categories of foreign objects 20 would result in different temperature, i.e. different level of infrared thermal radiation with respect to the background, i.e. the runway surface. The difference in temperature between the foreign object 20 and the runway would be detectable by the thermal camera 110.

Therefore, it is beneficial to "train" the thermal camera 110, or rather the thermal camera operating module 134T, to differentiate the different categories of foreign objects 20 by identifying the type of material which the foreign object 20 is made of, e.g. rubber, metallic, plastic, concrete, asphalt, etc. As foreign objects 20 made of the different types of materials would have different emissivity resulting in different level of temperature and different temperature contrast level with respect to the background, i.e. the runway, the "well-trained" thermal camera 110 would be able to identify a foreign object 20 more accurately.

To train the thermal camera 110. Under normal clear weather conditions, the thermal camera 110 may be put through an initial period of "training" whereby the thermal camera 110 may operate in "training" mode to enable it to "learn" from the visible light images 120M of the visible light camera 120. After the initial "training", the thermal camera 110 may be adequately "learned" to enable the thermal camera 110 to provide reliable and accurate foreign object 20 detection with relatively high level of accuracy. With a high level of accuracy, it would then be possible to enable a system 100 with a "standalone" thermal camera 110 instead of a set of visible light camera 120 and thermal camera 110. In this way, the system 100 will be applicable under adverse weather conditions and/or very low visibility conditions without the visible light camera 120.

Figure 10:
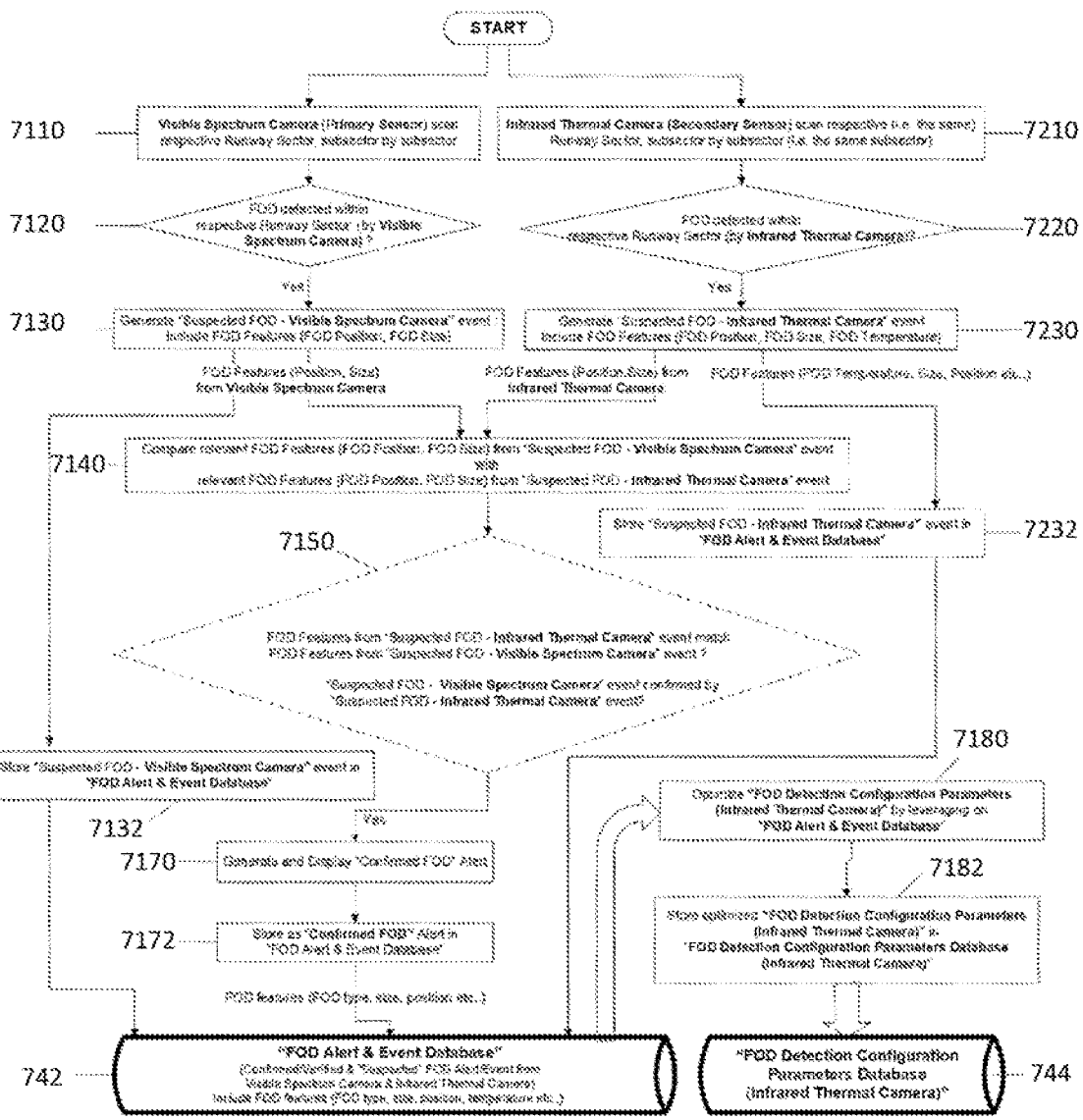
FIG. 10 show a flow diagram of a method for training the image identification module to improve the identification of a foreign object on runway.

FIG. 10 shows a flow diagram of a method for training the image processing module 134M to improve the identification of a foreign object 20 on runway. In block 7110, the visible light camera 120 may be configured to scan one of the plurality of sectors on the runway. Visible light camera 120 may be configured to scan a subsector by subsector of the sector. Visible light camera 120 may capture a plurality of visible light images 120M of the sector. Plurality of visible light images 120M may be processed by the image processing module 134M to detect the foreign object 20. In block 7210, the thermal camera 110 may be configured to scan the same sector on the runway scanned by the visible light camera 120. Thermal camera 110 may be configured to scan a subsector by subsector of the sector. Thermal camera 110 may capture a plurality of thermal images 110M of the sector.

Plurality of thermal images 110M may be processed by the image processing module 134M to detect the foreign object 20. Thermal camera 110 and the visible light camera 120 may be configured to scan the sector concurrently. In block 7120, the system 100 may detect a foreign object 20 after processing the visible light image 120M and identify the visible light object image 120B. In block 7220, the system 100 may detect a foreign object 20 after processing the thermal image 110M and identify the thermal object image 110B. Thermal image 110M and the visible light image 120M may be processed by the processor 132 concurrently. If the system 100 detects a foreign object 20 in the visible light image 120M, the system 100 may generate a "Suspected FOD" alert signal to inform the operator that a foreign object 20 has been detected in the visible light image 120M. Similarly, if the system 100 detects a foreign object 20 in the thermal image 110M, the system 100 may generate a "Suspected FOD" signal to inform the operator that a foreign object 20 has been detected in the thermal image 110M in block 7230 as the detection of the foreign object 20 has yet to be verified. The "Suspected FOD" alert signal may be generated for each of the visible light image 120M and the thermal image 110M. System 100 may display the thermal object image 110B and/or the visible light object image 120B on the display for the operator to view. System 100 may generate at least one attribute of the visible light object image 120B in block 7130 and generate at least one attribute of the thermal object image 110B in block 7230.

At least one attribute may include the position of the visible light object image 120B in the visible light image 120M, the position of the thermal object image 110B in the thermal image 110M, the size of the visible light object image 120B, the size of the thermal object image 110B and/or the temperature of the thermal object image 110B. For example, the system 100 may generate the position of the visible light object image 120B in the visible light image 120M and/or the size of the visible light object image 120B. For example, the system 100 may generate at least one of the position of the thermal object image 110B in the thermal image 110M, the size of the thermal object image 110B and the temperature of the foreign object 20. System 100 may be configured to store at least one of: the alert signal, attributes, features and the images of this event into a foreign object alert signal and event database 742 in block 7132 and block 7232. In block 7140, the system 100 may be configured to determine whether the foreign object 20 is present in the visible light image 120M and the thermal image 110M by comparing the at least one attribute of the visible light object image 120B and the thermal object image 110B. The method of comparing the at least one attribute may be shown in method 4140 in FIG. 7. If the attributes of the visible light object image 120B and the thermal object image 110B matches in block 7150, the system 100 determines that the foreign object 20 is detected in the visible light image 120M and the thermal image 110M. If the foreign object 20 has been detected, the system 100 may generate and display an alert signal, e.g. a "Confirmed FOD" alert signal in block 7170. Otherwise, the system 100 may generate and transmit a "No Confirmed FOD" alert signal. System 100 may be configured to store at least one of: the signal, attributes, features and the images into the foreign object alert signal and event database 742 in block 7172. In block 7180, the system 100 may be configured to optimize detection configuration parameters of the thermal camera 110. System 100 may optimize the detection configuration parameters based on the data stored in the foreign object alert signal and event database 742. System 100 may run statistical analysis and/or optimization modules to optimise the detection configuration parameters based on the data. System 100 may use artificial intelligence to optimize the detection configuration parameters based on the data. In block 7182, the system 100 may be configured to store the optimized detection configuration parameters of the thermal camera 110 in a foreign object 20 detection configuration parameters database 744 for the thermal camera 110.

System 100 may determine the relationship between the object category and the temperature of the foreign object 20 in the thermal image 110M for all the detected/verified foreign object samples. Processor 132 may be further configured to train the thermal camera 110 to detect the foreign object 20 based on the visible light images 120M from the visible light camera 120. As it is substantially easier to identify and categorise a foreign object 20 in visible light image 120M, the system 100 may form a relationship between the object category of the visible light object image 120B obtained from the visible light camera 120 and the temperature of the thermal object image 110B from the thermal camera 110. Hence, with a sufficiently large foreign object sample size, the system 100 would be able to determine the relationship between different foreign object categories, e.g. foreign object made of different materials, such as metal, plastic, rubber, etc. and their corresponding temperatures. System 100 may then be able to build an "FOD Type Thermal Profile Model" which could be used to map the various foreign object types, i.e. made of different materials, to their corresponding temperature ranges. In this way, the system may be able to identify the foreign object 20 more easily based on the thermal object image 110B thereof.

The "FOD Type Thermal Profile Model" would enable the system 100 to determine the foreign object category or type, including the specific type of material which the foreign object 20 is made of, such as metal, rubber, plastic, etc. of any detected foreign object 20 based on the temperature of the foreign object 20 detected by the thermal camera 110. The development of the "FOD Type Thermal Profile Model" may be based on mathematical methods and/or statistically methods, such as statistical correlation analysis. Alternatively, the development of the "FOD Type Thermal Profile Model" may be based on artificial intelligence and machine learning technologies. This "FOD Type Thermal Profile Model" may be used to optimize the detection configuration parameters of the thermal camera 110.

To optimize the performance of the thermal camera 110, it is necessary to optimize the detection configuration parameters of the thermal camera 110. The detection configuration parameters of the thermal camera 110 may be a set of operating parameters pertaining to the thermal camera 110 to enable the thermal camera 110 to detect foreign objects 20 with optimum and high level of accuracy. Operating parameters of the thermal camera 110 may include sensitivity, gain, brightness, contrast, shutter timing settings, etc. In this way, as the system 100 trains the thermal camera operating module 134T, the detection performance of the thermal camera 110 would be improved over time to a level at which it may be able to operate as "standalone" and sole foreign object detector for the system 100, i.e. without the visible light camera 120. The optimized performance thermal camera 110 would be beneficial under adverse weather conditions and/or under very low visibility conditions.

The various temperature contrast levels due to different types of foreign object materials may be detected by the thermal camera 110. This would enable the thermal camera 110 to detect a foreign object 20 accurately. This may also enable the system 100 to classify or recognise the different categories or types of foreign object 20 based on the different types of materials which the foreign object 20 is made of.

Database 742 may contain the alert signals, e.g. "Suspected FOD", "Confirmed FOD" and events that took place in the methods for both the visible light camera 120 and the thermal camera 110. Database 742 may store the detected and/or computed foreign object 20 attributes, e.g. category, size, position, temperature, etc.

Figure 11:
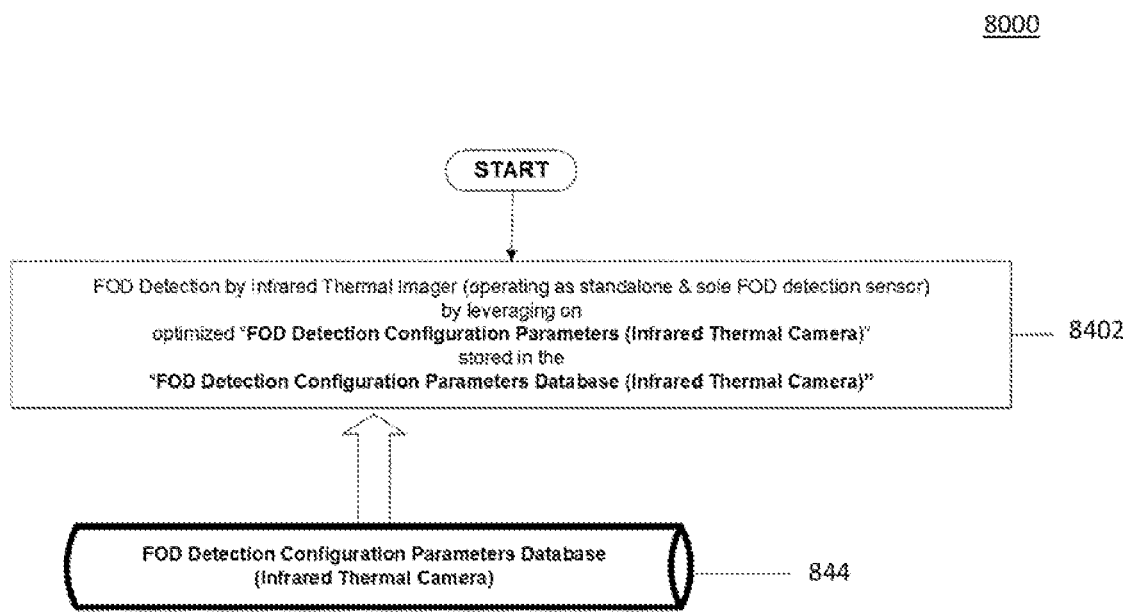
FIG. 11 shows a flow diagram of a method for detecting a foreign object with a thermal camera.

FIG. 11 shows a flow diagram of a method 8000 for detecting a foreign object 20 with a thermal camera 110. After the "training", the thermal camera 110 may be able to provide reliable and accurate foreign object 20 detection with relatively high level of accuracy. With a high level of accuracy, it would then be possible for the thermal camera 110 to be used without the visible light camera 120. Referring to FIG. 11, the system 100 may be configured to detect a foreign object 20 by leveraging on optimized detection configuration parameters for the thermal camera 110 stored in the detection configuration parameters database 844 for the thermal camera 110 in block 8402. Thermal camera 110 may be configured as the sole foreign object detector to detect a foreign object 20.

A skilled person would appreciate that the features described in one example may not be restricted to that example and may be combined with any one of the other examples.

The present invention relates to a system for detecting a foreign object on a runway and a method thereof generally as herein described, with reference to and/or illustrated in the accompanying drawings.

The invention claimed is:
1. A method for detecting a foreign object on a runway divided into a plurality of sectors, the method comprising:

capturing a plurality of thermal images of a first view of the plurality of sectors of the runway from one side of the runway from a first field of view, capturing a plurality of visible light images of the first view of the plurality of sectors of the runway from the one side of the runway from a second field of view wherein the first field of view overlaps the second field of view, detecting a thermal object image in the plurality of thermal images, detecting a visible light object image in the plurality of visible light images, determining that the foreign object is detected when the thermal object image and the visible light object image are detected in one of the plurality of thermal images and one of the plurality of the visible light images respectively, transforming the plurality of visible light images and the plurality of thermal images to a plurality of transformed visible light images and a plurality of transformed thermal images respectively, wherein the plurality of transformed visible light images and the plurality of transformed thermal images are of a cockpit view, wherein the cockpit view is the view of the runway from a cockpit of an aircraft, stitching the plurality of transformed visible light images to form a unitary visible light image, stitching the plurality of transformed thermal images to form a unitary thermal image, and transmitting the unitary thermal image and the unitary visible light image to a display in the cockpit of the aircraft.

2. The method according to claim 1, wherein the first view comprises a perspective view.

3. The method according to claim 1, wherein the second view comprises a cockpit view when viewed from the cockpit of an aircraft.

4. The method according to claim 1, wherein transforming the plurality of visible light images comprises rotating and/or warping the plurality of visible light images.

5. The method according to claim 1, wherein transforming the plurality of thermal images comprises rotating and/or warping the plurality of thermal images.

6. The method according to claim 1, wherein determining the foreign object comprises generating at least one attribute of the foreign object in each of the thermal object image and visible light object image, comparing the at least one attribute of the foreign object in the thermal object image and the visible light object image, wherein the foreign object is detected when the at least one attribute of the foreign object in thermal object image and the visible light object image are the same.

7. The method according to claim 6, wherein the at least one attribute of the foreign object comprises the position of the thermal object image in the thermal image and the position of the visible light object image in the visible light image.

8. The method according to claim 7, wherein the at least one attribute of the foreign object in thermal object image and the visible light object image are the same when the distance between the position of the thermal object image in the thermal image and the position of the visible light object image in the visible light image is within a position parameter.

9. The method according to claim 6, wherein the at least one attribute of the foreign object comprises the size of the thermal object image and visible light object image.

10. The method according to claim 9, wherein the at least one attribute of the foreign object in the thermal object image and visible light object image are the same when the difference in the size of the thermal object image in the thermal image and the size of the visible light object image in the visible light image is within a size parameter.

11. A system for detecting a foreign object on a runway divided into a plurality of sectors, the system comprising:

a plurality of sets of cameras spaced apart from each other, each of the plurality of sets of cameras comprises:

a thermal camera comprising a first field of view and adapted to capture a thermal image of a first view of one of the plurality of sectors of the runway from one side of the runway, a visible light camera comprising a second field of view and adapted to capture a visible light image of the first view of the one of the plurality of sectors of the runway from the one side of the runway, wherein the first field of view overlaps the second field of view, a processor in communication with the plurality of sets of cameras, a memory in communication with the processor for storing instructions executable by the processor, wherein the processor is configured to:

detect a thermal object image in the plurality of thermal images, detect a visible light object image in the plurality of visible light images, determine that the foreign object is detected when the thermal object image and the visible light object image are detected in one of the plurality of thermal images and one of the plurality of visible light images respectively, transform the plurality of visible light images and the plurality of thermal images to a plurality of transformed visible light images and a plurality of transformed thermal images respectively, wherein the plurality of transformed visible light images and the plurality of transformed thermal images are of a cockpit view, wherein the cockpit view is the view of the runway from a cockpit of an aircraft, stitch the plurality of transformed visible light images from the plurality of sets of cameras to form a unitary visible light image, stitch the plurality of transformed thermal images from the plurality of sets of cameras to form a unitary thermal image, transmit the unitary thermal image and the unitary visible light image to a display in the cockpit of the aircraft.

12. The system according to claim 11, wherein the first view comprises a perspective view.

13. The system according to claim 11, wherein to transform the visible light image, the processor is configured to rotate and/or warp the visible light image.

14. The system according to claim 11, wherein to transform the thermal image, the processor is configured to rotate and/or warp the thermal image.

15. The system according to claim 11, wherein to determine the foreign object, the processor is configured to generate at least one attribute of the foreign object in each of the thermal object image and visible light object image, compare the at least one attribute of the foreign object in the thermal object image and the visible light object image, wherein the foreign object is detected when the at least one attribute of the foreign object in thermal object image and the visible light object image are the same.

16. The system according to claim 15, wherein the at least one attribute of the foreign object comprises the position of the thermal object image in the thermal image and the position of the visible light object image in the visible light image.

17. The system according to claim 16, wherein the at least one attribute of the foreign object in thermal object image and the visible light object image are the same when the distance between the position of the thermal object image in the thermal image and the position of the visible light object image in the visible light image is within a position parameter.

18. The system according to claim 15, wherein the at least one attribute of the foreign object comprises the size of the thermal object image and visible light object image.

19. The system according to claim 18, wherein the at least one attribute of the foreign object in the thermal object image and visible light object image are the same when the difference in the size of the thermal object image in the thermal image and the size of the visible light object image in the visible light image is within a size parameter.

\* \* \* \* \*